US011850953B2

United States Patent
Sato et al.

(10) Patent No.: US 11,850,953 B2
(45) Date of Patent: Dec. 26, 2023

(54) VEHICLE DRIVE UNIT

(71) Applicants: Mazda Motor Corporation, Hiroshima (JP); Rohm Co., Ltd., Kyoto (JP)

(72) Inventors: Takayuki Sato, Aki-gun (JP); Masashi Hayashiguchi, Kyoto (JP)

(73) Assignees: MAZDA MOTOR CORPORATION, Hiroshima (JP); ROHM CO., LTD, Kyoto (JP)

( * ) Notice: Subject to any disclaimer, the term of this patent is extended or adjusted under 35 U.S.C. 154(b) by 0 days.

(21) Appl. No.: 17/970,507

(22) Filed: Oct. 20, 2022

(65) Prior Publication Data
US 2023/0135655 A1 May 4, 2023

(30) Foreign Application Priority Data

Oct. 29, 2021 (JP) .................. 2021-178193

(51) Int. Cl.
| | |
|---|---|
| B60L 7/14 | (2006.01) |
| B60L 50/51 | (2019.01) |
| H02K 3/28 | (2006.01) |
| H02M 7/00 | (2006.01) |
| H02M 7/537 | (2006.01) |

(52) U.S. Cl.
CPC .............. B60L 50/51 (2019.02); H02K 3/28 (2013.01); H02M 7/003 (2013.01); H02M 7/537 (2013.01); *B60L 2210/40* (2013.01); *B60L 2220/50* (2013.01)

(58) Field of Classification Search
CPC .. B60L 50/51; B60L 2210/40; B60L 2220/50; H02K 3/28; H02M 7/003; H02M 7/537
See application file for complete search history.

(56) References Cited

U.S. PATENT DOCUMENTS

| | | |
|---|---|---|
| 2016/0276895 A1 | 9/2016 | Aizawa et al. |
| 2018/0198401 A1* | 7/2018 | Thongam .................. B60L 7/14 |
| 2019/0181766 A1* | 6/2019 | Ge .......................... B60L 50/51 |
| 2020/0028434 A1* | 1/2020 | Ge ......................... B60L 15/007 |

FOREIGN PATENT DOCUMENTS

| | | |
|---|---|---|
| EP | 3346587 A1 | 7/2018 |
| JP | 2013198367 A | 9/2013 |
| JP | 2021112011 A | 8/2021 |

* cited by examiner

*Primary Examiner* — Jared Fureman
*Assistant Examiner* — Esayas G Yeshaw
(74) *Attorney, Agent, or Firm* — Alleman Hall Creasman & Tuttle LLP

(57) ABSTRACT

In a drive unit, a motor and an inverter having power modules are disposed adjacent in an axial direction of the motor. In the motor, first and second coil groups, each including one U-phase coil, one V-phase coil, and one W-phase coil, are provided. The power modules constitute first and second power module groups that are connected in parallel. The first and second power module groups each include one U-phase power module, one V-phase power module, and one W-phase power module. A distance between the U-phase power module of the first power module group and the U-phase coil of the first coil group, a distance between the V-phase power module of the first power module group and the V-phase coil of the first coil group, and a distance between the W-phase power module of the first power module group and the W-phase coil of the first coil group are equal.

20 Claims, 18 Drawing Sheets

VEHICLE DRIVE UNIT

BACKGROUND OF THE INVENTION

1. Field of the Invention

The present disclosure relates to a vehicle drive unit including a motor and an inverter.

2. Description of the Related Art

A drive unit that drives a motor by converting direct current from a battery into alternating current by an inverter is known. The inverter has a power module including a switching element. An inverter disclosed in Japanese Unexamined Patent Application Publication No. 2021-112011 includes a power module unit including a U-phase power module, a V-phase power module, and a W-phase power module. The phase power modules correspond to respective phase coils of the motor.

Since an inverter of this type handles high electric power, a high voltage is applied and a large current flows. Therefore, the heat generation amount at the time of operation is large, and thus cooling is required. A high surge voltage is also generated. Therefore, individual electronic components of the inverter become large, and also tend to be heavy. Consequently, the inverter of the related art is a factor that prevents fuel costs and electricity costs from being reduced.

In order to reduce a power transmission distance, the inverter is ordinarily disposed near a drive motor. However, in the case of a car, there are many devices to be installed and thus a space in which the inverter can be disposed is limited. It is also necessary to consider the balance of a car body. Therefore, it is difficult to adequately dispose a large, heavy inverter in a car.

With regard to such a problem, in Japanese Unexamined Patent Application Publication No. 2021-112011, the inverter is made small and light by integrating the inverter with the motor.

Each phase power module of the inverter is connected to a corresponding one of the phase coils of the motor via an electrical connection member. Since a large current flows in the electrical connection member, the electrical connection member is large and heavy. When a wiring length of the electrical connection member increases, the electrical resistance increases correspondingly, and thus copper loss occurs at the time of energization. The electrical connection member generates a large amount of heat. Moreover, in the inverter, since the large current is turned on and off at a high speed by switching control, a large change in magnetic field occurs in the electrical connection member.

Therefore, when the inverter operates, noise, vibration, electromagnetic interference, and the like occur at the electrical connection member due to the changing magnetic field. The noise, vibration, electromagnetic interference, and the like result in energy loss and variously adversely affect the performance of the car, as a result of which measures need to be taken.

Therefore, from the viewpoint of motor control, it is important to reduce inductances of electrical paths extending from the phase power modules to the respective phase coils of the motor, and to equalize the inductances between the U phase, the V phase, and the W phase. In particular, when the output of the motor is large, it is important to reduce and equalize the inductances of the electrical paths.

On the other hand, in order to increase the output of the motor, it is important to increase the number of power modules of the inverter. However, an increase in the size of the inverter caused by an increase in the number of power modules is to be avoided.

SUMMARY OF THE INVENTION

The present disclosure has been made in view of such points, and it is an object of the present disclosure to, while suppressing a drive unit including a motor and an inverter from increasing in size, increase an output of a motor, and reduce and equalize inductances of electrical paths extending from phase power modules to respective phase coils.

A vehicle drive unit according to a first aspect of the present disclosure includes a motor and an inverter disposed adjacent to each other in an axial direction of the motor, the inverter having a plurality of power modules. In the vehicle drive unit, each power module is placed on a placement surface orthogonal to the axial direction. In the motor, at least a first coil group and a second coil group are provided, each including one U-phase coil, one V-phase coil, and one W-phase coil. The plurality of power modules constitute at least a first power module group and a second power module group that are connected in parallel. The first power module group and the second power module group each include one U-phase power module, one V-phase power module, and one W-phase power module corresponding to the U-phase coil, the V-phase coil, and the W-phase coil, respectively, of the first coil group or the second coil group. Each power module of the first power module group is connected to a corresponding one of the coils of the first coil group, and each power module of the second power module group is connected to a corresponding one of the coils of the second coil group. When seen in the axial direction, a distance between the U-phase power module of the first power module group and the U-phase coil of the first coil group, a distance between the V-phase power module of the first power module group and the V-phase coil of the first coil group, and a distance between the W-phase power module of the first power module group and the W-phase coil of the first coil group are equal to each other.

According to such a structure, since the first power module group and the second power module group of the inverter are connected in parallel, the output of the motor can be increased.

Since each power module is placed side by side on the placement surface orthogonal to the axial direction of the motor, the axial-direction length of the inverter can be suppressed from being increased even though the number of power modules has been increased.

Since the motor and the inverter are disposed adjacent to each other in the axial direction of the motor, the distances between the phase power modules and the respective phase coils can be reduced. Therefore, the inductances of the electrical paths extending from the phase power modules to the respective phase coils can be reduced.

Further, in the first power module group and the first coil group, when seen in the axial direction of the motor, the distances between the phase power modules and the respective phase coils are equal to each other between the U phase, the V phase, and the W phase. Therefore, in the first power module group and the first coil group, the inductances of the electrical paths extending from the phase power modules to the respective phase coils can be equalized between the U phase, the V phase, and the W phase.

Accordingly, while suppressing the drive unit including a motor and an inverter from increasing in size, the output of the motor is increased, and the inductances of the electrical paths extending from the phase power modules to the respective phase coils can be reduced and equalized.

In one embodiment, when seen in the axial direction, a distance between the U-phase power module of the second power module group and the U-phase coil of the second coil group, a distance between the V-phase power module of the second power module group and the V-phase coil of the second coil group, and a distance between the W-phase power module of the second power module group and the W-phase coil of the second coil group are equal to each other.

According to such a structure, even in the second power module group and the second coil group, as in the first power module group and the first coil group, the inductances of the electrical paths extending from the phase power modules to the respective phase coils can be equalized between the U phase, the V phase, and the W phase.

In one embodiment, when seen in the axial direction, the distance between the U-phase power module of the first power module group and the U-phase coil of the first coil group and the distance between the U-phase power module of the second power module group and the U-phase coil of the second coil group are equal to each other, the distance between the V-phase power module of the first power module group and the V-phase coil of the first coil group and the distance between the V-phase power module of the second power module group and the V-phase coil of the second coil group are equal to each other, and the distance between the W-phase power module of the first power module group and the W-phase coil of the first coil group and the distance between the W-phase power module of the second power module group and the W-phase coil of the second coil group are equal to each other.

According to such a structure, the inductances of the electrical paths extending from the phase power modules to the respective phase coils can be equalized between the first power module group and the first coil group and the second power module group and the second coil group.

In one embodiment, in the motor, the U-phase coils, the V-phase coils, and the W-phase coils of each of the first and second coil groups are each wound in a concentrated manner. When seen in the axial direction, the U-phase power module of the first power module group is disposed at a position overlapping the U-phase coils of the first coil group, the V-phase power module of the first power module group is disposed at a position overlapping the V-phase coils of the first coil group, and the W-phase power module of the first power module group is disposed at a position overlapping the W-phase coils of the first coil group.

According to such a structure, in the first power module group and the first coil group, the distances between the phase power modules and the corresponding phase coils can be reduced. Therefore, in the first power module group and the first coil group, the inductances of the electrical paths extending from the phase power modules to the corresponding phase coils can be reduced.

In one embodiment, when seen in the axial direction, the U-phase power module of the second power module group is disposed at a position overlapping the U-phase coils of the second coil group, the V-phase power module of the second power module group is disposed at a position overlapping the V-phase coils of the second coil group, and the W-phase power module of the second power module group is disposed at a position overlapping the W-phase coils of the second coil group.

According to such a structure, even in the second power module group and the second coil group, as in the first power module group and the first coil group, the inductances of the electrical paths extending from the phase power modules to the corresponding phase coils can be reduced.

In one embodiment, each of the power modules of the first power module group is disposed on one side in a radial direction of the motor, each of the power modules of the second power module group is disposed on an opposite side in the radial direction, the U-phase power module of the first power module group and the U-phase power module of the second power module group oppose each other in the radial direction, the V-phase power module of the first power module group and the V-phase power module of the second power module group oppose each other in the radial direction, and the W-phase power module of the first power module group and the W-phase power module of the second power module group oppose each other in the radial direction.

In the motor (in particular, a concentrated winding type in which the number of coils is even), coils of the same phase are often disposed so as to oppose each other in the radial direction of the motor. According to such a structure, as with the coils of the same phase, power modules of the same phase are disposed so as to oppose each other in the radial direction of the motor. Therefore, the phase power modules are easily positioned with respect to the respective phase coils.

In one embodiment, at least an output busbar is interposed between each of the power modules and each of the coils, and the output busbar is formed with a width greater than a thickness thereof so as to extend widthwise along a peripheral direction of the motor.

According to such a structure, since the output busbar is easily formed with a wide width, the inductance of the output busbar is easily reduced.

In one embodiment, the inverter has a smoothing capacitor placed on the placement surface.

Such a structure is advantageous in terms of suppressing an increase in the axial-direction length of the inverter.

In one embodiment, the smoothing capacitor and each power module are connected to each other by a negative-electrode-side busbar and a positive-electrode-side busbar, serving as input busbars, one end portion of each input busbar is connected to the smoothing capacitor, the other end portion of each input busbar is connected to each power module, an inductance of each input busbar is a function of a length extending from the one end portion to the other end portion of each input busbar, the function has a minimum value so that the inductances become the same at a first length and a second length that differ from each other, the length of one of the negative-electrode-side busbar and the positive-electrode-side busbar is the first length, and the length of the other of the negative-electrode-side busbar and the positive-electrode-side busbar is the second length.

According to such a structure, in each input busbar that connects the smoothing capacitor and each power module to each other, the inductance of the negative-electrode-side busbar and the inductance of the positive-electrode-side busbar can be equalized with respect to each other even though the length of the negative-electrode-side busbar and the length of the positive-electrode-side busbar differ from each other.

A vehicle drive unit according to a second aspect of the present disclosure includes a motor and an inverter disposed adjacent to each other in an axial direction of the motor, the inverter having a plurality of power modules. In the vehicle drive unit, each power module is placed on a placement surface orthogonal to the axial direction. In the motor, at least a first coil group and a second coil group are provided, each including one U-phase coil, one V-phase coil, and one W-phase coil. The plurality of power modules constitute at least a first power module group and a second power module group that are connected in parallel. The first power module group and the second power module group each include one U-phase power module, one V-phase power module, and one W-phase power module corresponding to the U-phase coil, the V-phase coil, and the W-phase coil, respectively, of the first coil group or the second coil group. Each power module of the first power module group is connected to a corresponding one of the coils of the first coil group, and each power module of the second power module group is connected to a corresponding one of the coils of the second coil group. When seen in the axial direction, the U-phase power module of the first power module group is disposed at a position overlapping the U-phase coil of the first coil group, the V-phase power module of the first power module group is disposed at a position overlapping the V-phase coil of the first coil group, and the W-phase power module of the first power module group is disposed at a position overlapping the W-phase coil of the first coil group.

According to such a structure, since the first power module group and the second power module group of the inverter are connected in parallel, the output of the motor can be increased.

Since each power module is placed side by side on the placement surface orthogonal to the axial direction of the motor, the axial-direction length of the inverter can be suppressed from being increased even though the number of power modules has been increased.

Since the motor and the inverter are disposed adjacent to each other in the axial direction of the motor, the distances between the phase power modules and the respective phase coils can be reduced. Therefore, the inductances of the electrical paths extending from the phase power modules to the respective phase coils can be reduced.

Further, in the first power module group and the first coil group, when seen in the axial direction of the motor, the phase power modules are disposed at positions overlapping the respective phase coils. Therefore, in the first power module group and the first coil group, the inductances of the electrical paths extending from the phase power modules to the respective phase coils can be equalized between the U phase, the V phase, and the W phase.

Accordingly, while suppressing the drive unit including a motor and an inverter from increasing in size, the output of the motor is increased, and the inductances of the electrical paths extending from the phase power modules to the respective phase coils can be reduced and equalized.

In one embodiment, when seen in the axial direction, the U-phase power module of the second power module group is disposed at a position overlapping the U-phase coil of the second coil group, the V-phase power module of the second power module group is disposed at a position overlapping the V-phase coil of the second coil group, and the W-phase power module of the second power module group is disposed at a position overlapping the W-phase coil of the second coil group.

According to such a structure, even in the second power module group and the second coil group, as in the first power module group and the first coil group, the inductances of the electrical paths extending from the phase power modules to the respective phase coils can be equalized between the U phase, the V phase, and the W phase.

According to the present disclosure, while suppressing the drive unit including a motor and an inverter from increasing in size, the output of the motor is increased, and the inductances of the electrical paths extending from the phase power modules to the respective phase coils can be reduced and equalized.

DESCRIPTION OF THE PREFERRED EMBODIMENTS

Embodiments of the present disclosure are described in detail below based on the drawings. The description of preferable embodiments below merely substantially gives exemplifications, and is not intended at all to limit the present disclosure, applicable matters thereof, or use thereof.

First Embodiment

Vehicle Structure

Figure 1:
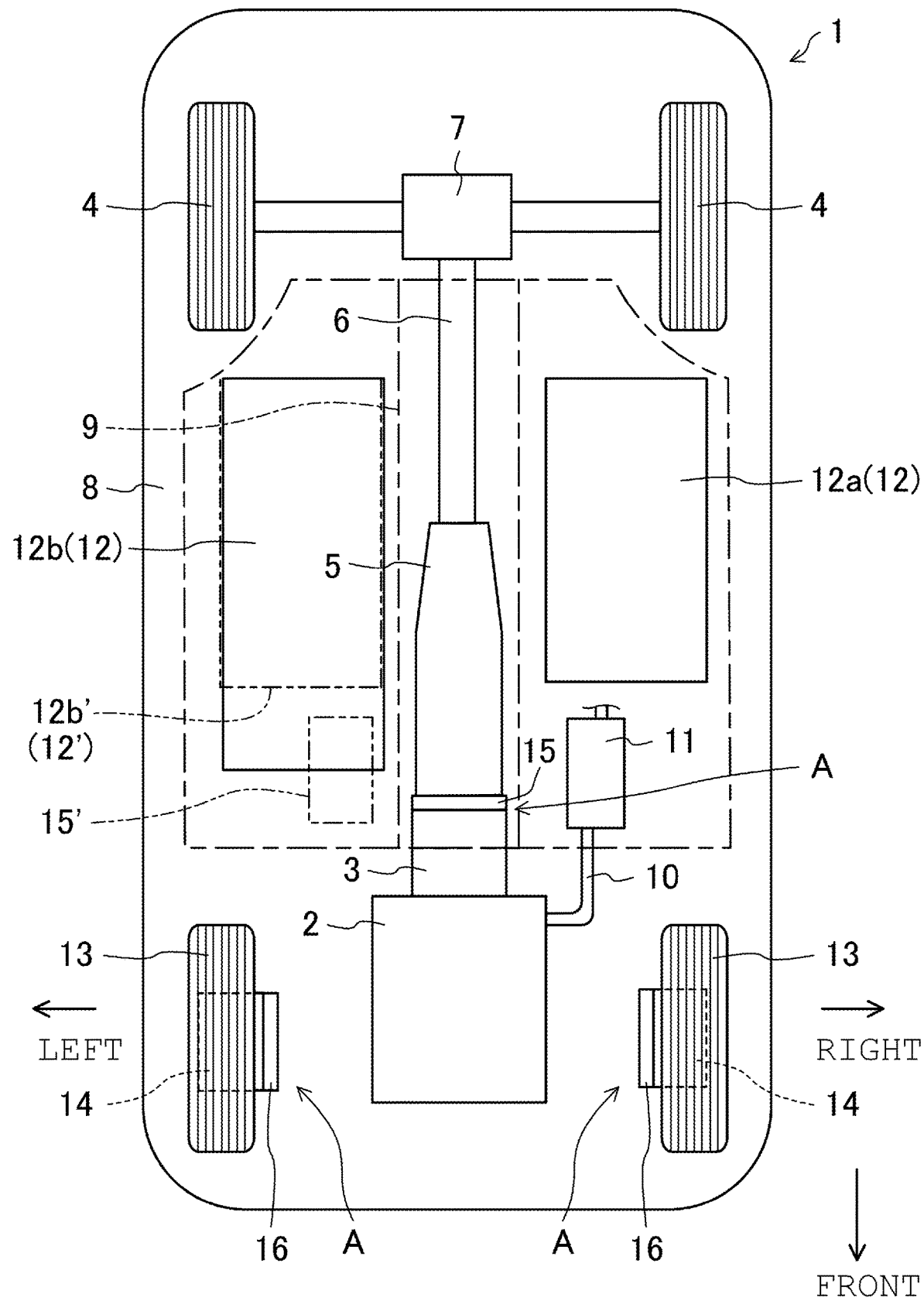
FIG. 1 is a schematic structural view of a vehicle system including a drive unit according to a first embodiment.

FIG. 1 shows a vehicle 1 including drive units A according to a first embodiment when seen from below the vehicle.

In the vehicle 1, power from at least one of an engine 2 and a drive motor 3 disposed at the front of the vehicle is transmitted to rear wheels 4 disposed at the rear of the vehicle. That is, the vehicle 1 is a hybrid vehicle of a front engine/rear drive (FR) type.

As shown in FIG. 1, the vehicle 1 includes the engine 2, a transmission 5 that is connected to the engine 2, the drive motor 3 that is disposed between the engine 2 and the transmission 5, a propeller shaft 6 that is connected to the transmission 5 and that transmits power from the engine 2 and the drive motor 3 to the rear wheels, and a differential 7 that is connected to the propeller shaft 6 and that transmits power from the engine 2 and the drive motor 3 to the left and right rear wheels 4.

The propeller shaft 6 extends below a floor panel 8 in a vehicle front-rear direction. A tunnel portion 9 is provided on a central side in a vehicle width direction of the floor panel 8. The propeller shaft 6 is disposed on an inner side of the tunnel portion 9.

The vehicle 1 includes an exhaust pipe 10 extending in the vehicle front-rear direction from the engine 2. A catalytic device 11 is disposed on an upstream side of the exhaust pipe 10. Although not shown, a silencer is disposed on a downstream side of the exhaust pipe 10.

The vehicle 1 includes a fuel tank (not shown) that stores fuel to be supplied to the engine 2, and a battery 12 that stores electric power to be supplied to the motor 3. The drive motor 3 transmits power to the rear wheels 4, and is rotationally driven by the propeller shaft 6 and generates regenerative power when the speed of the vehicle is reduced to supply the generated electric power to the battery 12. The battery 12 includes a first battery unit 12a and a second battery unit 12b, which are disposed one on each side in the vehicle width direction. The second battery unit 12b is longer than the first battery unit 12a in the vehicle front-rear direction. Each of the battery units 12a and 12b includes a plurality of battery cells. The battery cells are, for example, lithium-ion batteries.

An in-wheel motor 14 is connected to each of left and right front wheels 13. Each in-wheel motor 14 functions as an assist motor that generates power and transmits the power to the front wheels 13 when the vehicle 1 is started. Each in-wheel motor 14 functions as a regenerative brake that generates electric power when the speed of the vehicle is reduced. Similarly to the drive motor 3, each in-wheel motor 14 has electric power supplied thereto from the battery 12.

As shown in FIG. 1, an inverter 15 is interposed between the drive motor 3 and the transmission 5. The drive motor 3 and the inverter 15 are disposed adjacent to each other in an axial direction of the drive motor 3 (vehicle front-rear direction). Inverters 16 are disposed on inner sides of the respective in-wheel motors 14 in the vehicle width direction. The in-wheel motors 14 and the respective inverters 16 are disposed adjacent to each other in an axial direction of each in-wheel motor 14 (vehicle width direction). The drive motor 3 and the inverter 15 constitute the drive unit A. Similarly, the in-wheel motors 14 and the respective inverters 16 constitute the drive units A.

The inverter 15 and the inverters 16 each convert direct-current electric power stored in the battery 12 into alternating-current electric power and supply the converted electric power to a corresponding one of the motor 3 and the motors 14, and each convert the alternating-current electric power generated at the corresponding one of the motor 3 and the motors 14 into direct-current electric power to charge the battery when the speed of the vehicle is reduced.

Drive Units

Figure 2:
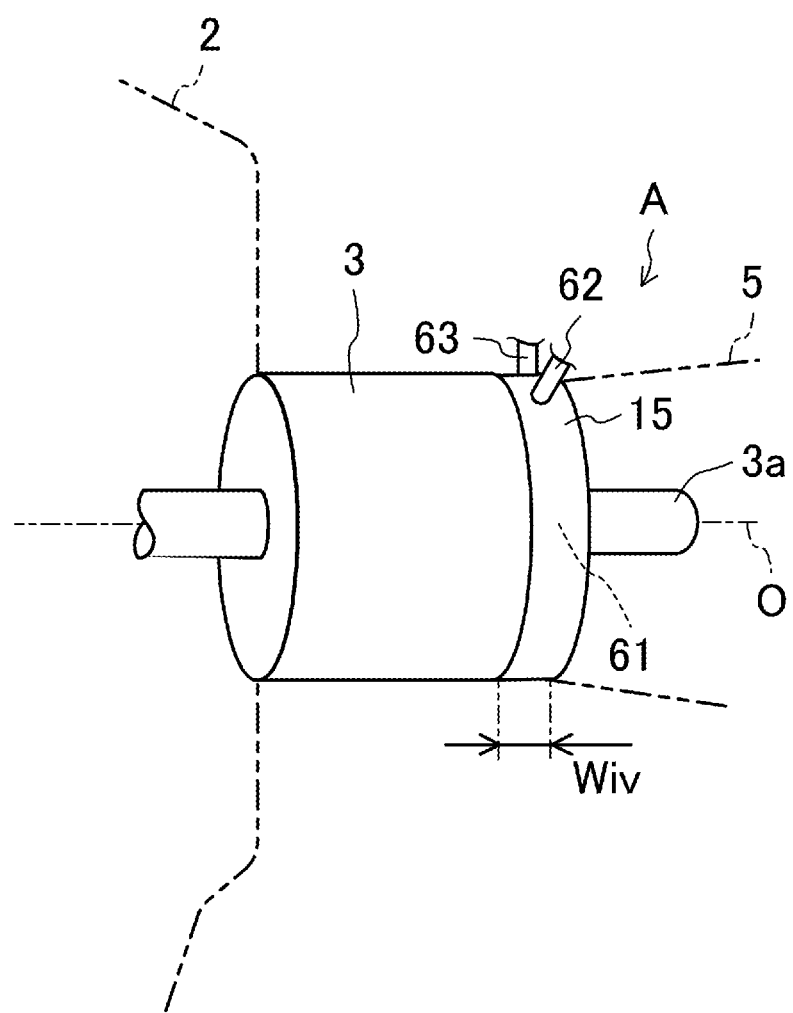
FIG. 2 is a perspective view of the drive unit including a motor and an inverter.

The drive units A of the vehicle 1 are described by taking as an example, the drive unit A including the drive motor 3 and the inverter 15. FIG. 2 is a perspective view of the drive unit A. As described above, the drive unit A includes the motor 3 and the inverter 15. The motor 3 and the inverter 15 are disposed adjacent and coaxially to each other in the axial direction of the motor 3. Specifically, a center axis O of the motor 3 and a center axis O of the inverter 15 coincide with each other. The motor 3 (specifically, a casing of the motor 3) is formed with a cylindrical shape. The inverter 15 (specifically, a casing of the inverter 15) is formed with a cylindrical shape corresponding to that of the motor 3. A rotation shaft 3a of the motor 3 extends through the inverter 15 in the axial direction. A thickness Wiv of the inverter 15 is small, and is, for example, 50 mm or less (preferably, 30 mm or less). A cooling path 61 (described later) is provided inside the inverter 15. A cooling inlet pipe 62 and a cooling outlet pipe 63 that communicate with the cooling path 61 are connected to an upper portion of the inverter.

Figure 3:
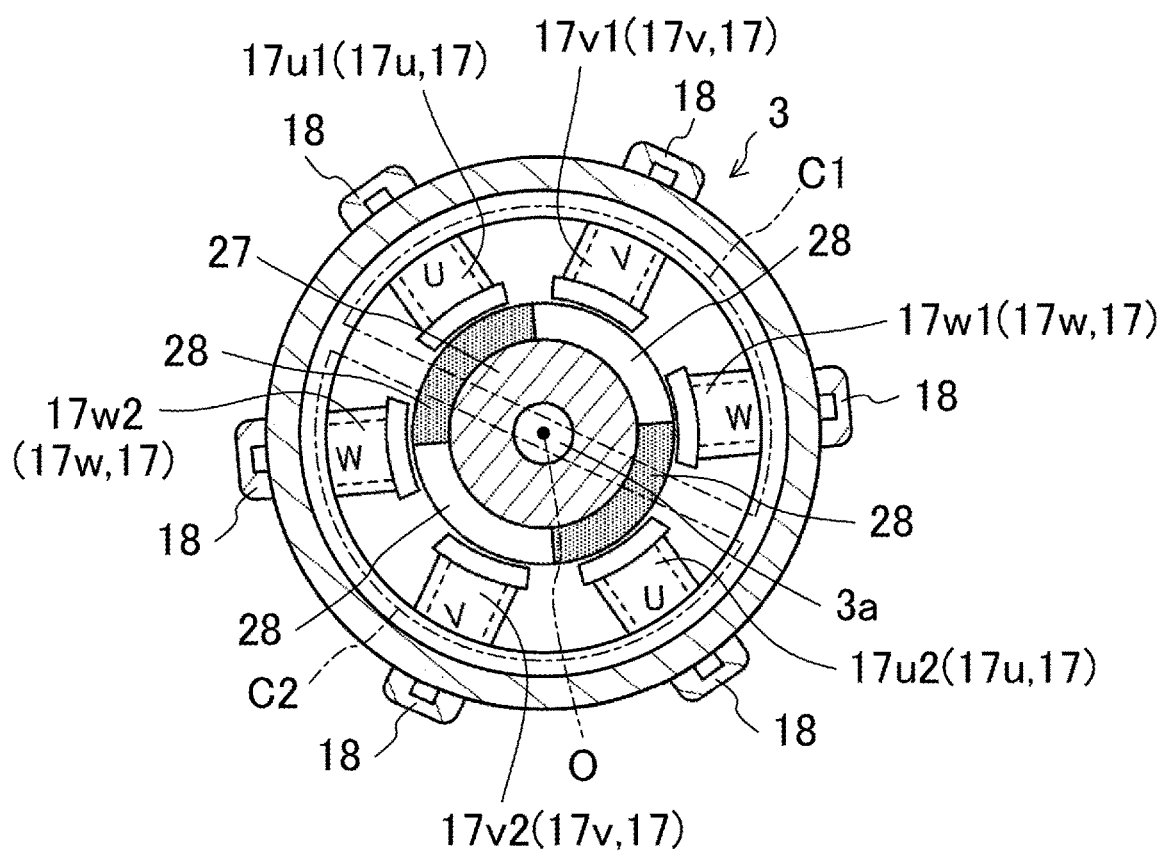
FIG. 3 is a cross sectional view of the motor when seen from the inverter.

FIG. 3 is a cross sectional view of the motor 3 when seen from the inverter 15. The motor 3 has coils 17. Specifically, each coil 17 is wound in a concentrated manner on a stator of the motor 3 so that two U-phase coils 17u, two V-phase coils 17v, and two W-phase coils 17w are disposed. Each coil 17 is disposed side by side uniformly in a peripheral direction of the motor 3.

The U-phase coils 17u include a first U-phase coil 17u1 and a second U-phase coil 17u2. The V-phase coils 17v include a first V-phase coil 17v1 and a second V-phase coil 17v2. The W-phase coils 17w include a first W-phase coil 17w1 and a second W-phase coil 17w2.

In the motor 3, a first coil group C1 and a second coil group C2 each including one U-phase coil 17u, one V-phase coil 17v, and one W-phase coil 17w are provided. Specifically, the first coil group C1 includes the first U-phase coil 17u1, the first V-phase coil 17v1, and the first W-phase coil 17w1. The second coil group C2 includes the second U-phase coil 17u2, the second V-phase coil 17v2, and the second W-phase coil 17w2.

Each of the phase coils 17u1, 17v1, and 17w1 of the first coil group C1 is disposed on one side in a radial direction of the motor 3. Each of the phase coils 17u2, 17v2, and 17w2 of the second coil group C2 is disposed on an opposite side in the radial direction of the motor 3.

The first U-phase coil 17u1 of the first coil group C1 and the second U-phase coil 17u2 of the second coil group C2 oppose each other in the radial direction of the motor 3. The first V-phase coil 17v1 of the first coil group C1 and the second V-phase coil 17v2 of the second coil group C2 oppose each other in the radial direction of the motor 3. The first W-phase coil 17w1 of the first coil group C1 and the second W-phase coil 17w2 of the second coil group C2 oppose each other in the radial direction of the motor 3.

Six motor-side terminal blocks 18 are provided at an outer peripheral portion of the motor 3. The motor-side terminal blocks 18 correspond to the respective coils 17. Specifically, each motor-side terminal block 18 is disposed at a corresponding peripheral-direction position and at a radial-direction outer side with respect to a corresponding one of the coils 17. A lead wire (not shown) extends from each coil 17. Each lead wire is connected to a corresponding one of the motor-side terminal blocks 18. As a rotor, an iron core 27 and a permanent magnet 28 having a N pole and a S pole are fixed to the rotation shaft 3a.

Figure 4:
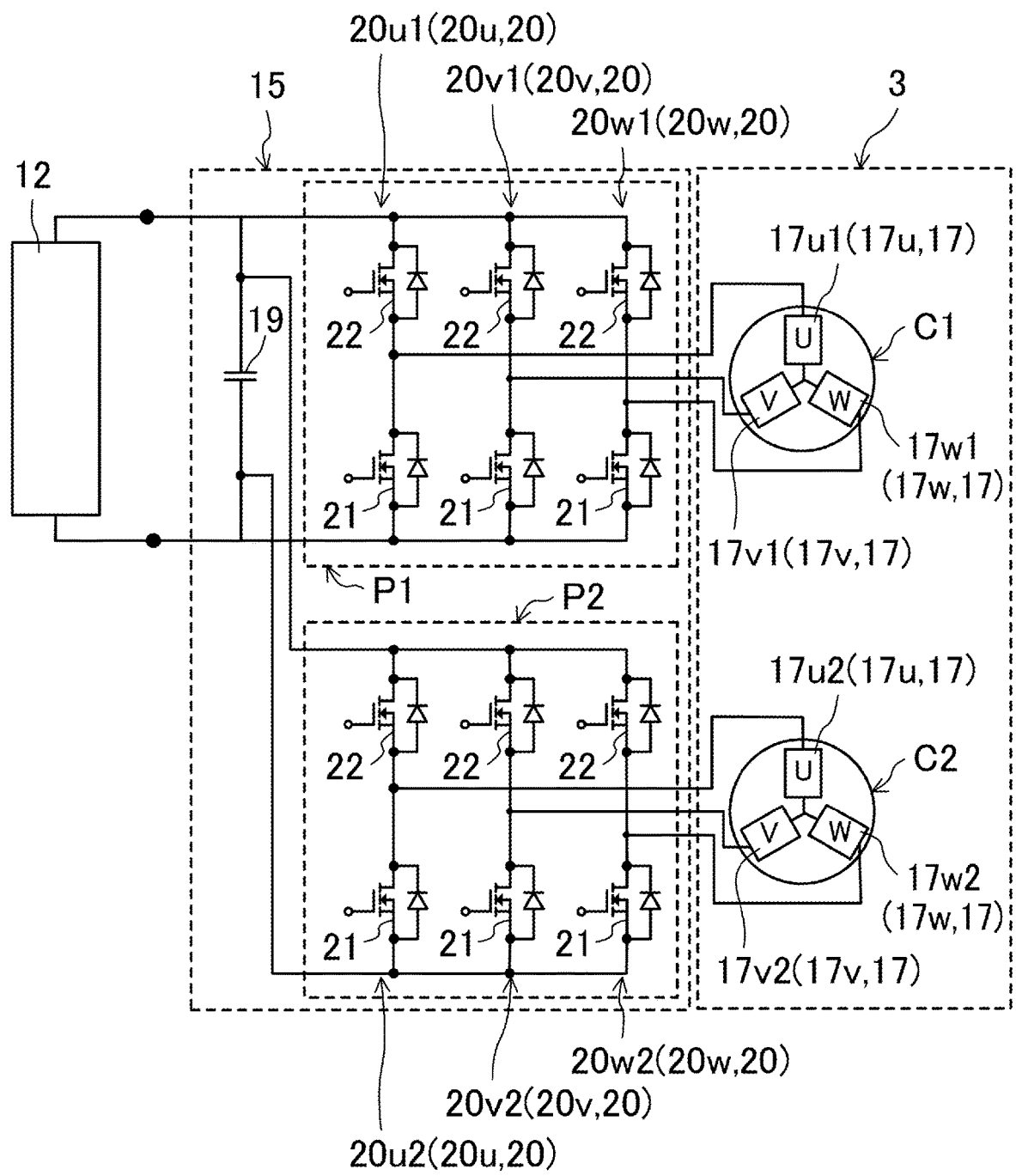
FIG. 4 is a circuit diagram of the inverter.

FIG. 4 is a circuit diagram of the inverter 15. The inverter 15 includes a smoothing capacitor 19 and a plurality of power modules 20. The smoothing capacitor 19 smoothens a voltage that is applied to the power modules 20. The plurality of power modules 20 constitute an inverter circuit, and convert direct-current voltage into an alternating-current voltage.

The plurality of power modules 20 include U-phase power modules 20u, V-phase power modules 20v, and W-phase power modules 20w. The U-phase power modules 20u correspond to the U-phase coils 17u. The V-phase power modules 20v correspond to the V-phase coils 17v. The W-phase power modules 20w correspond to the W-phase coils 17w.

Further, the U-phase power modules 20u include a first U-phase power module 20u1 and a second U-phase power module 20u2. the V-phase power modules 20v include a first V-phase power module 20v1 and a second V-phase power module 20v2. The W-phase power modules 20w include a first W-phase power module 20w1 and a second W-phase power module 20w2.

The plurality of power modules 20 constitute a first power module group P1 and a second power module group P2 that are connected in parallel. The first power module group P1 and the second power module group P2 each include one U-phase power module 20u, one V-phase power module 20v, and one W-phase power module 20w.

The first power module group P1 includes the first U-phase power module 20u1, the first V-phase power module 20v1, and the first W-phase power module 20w1. The phase power modules 20u1, 20v1, and 20w1 of the first power module group P1 are connected to the phase coils 17u1, 17v1, and 17w1 of the first coil group C1, respectively. Specifically, the first U-phase power module 20u1 of the first power module group P1 is connected to the first U-phase coil 17u1 of the first coil group C1. The first V-phase power module 20v1 of the first power module group P1 is connected to the first V-phase coil 17v1 of the first coil group C1. The first W-phase power module 20w1 of the first power module group P1 is connected to the first W-phase coil 17w1 of the first coil group C1.

The second power module group P2 includes the second U-phase power module 20u2, the second V-phase power module 20v2, and the second W-phase power module 20w2. The phase power modules 20u2, 20v2, and 20w2 of the second power module group P2 are connected to the phase coils 17u2, 17v2, and 17w2 of the second coil group C2, respectively. Specifically, the second U-phase power module 20u2 of the second power module group P2 is connected to the second U-phase coil 17u2 of the second coil group C2. The second V-phase power module 20v2 of the second power module group P2 is connected to the second V-phase coil 17v2 of the second coil group C2. The second W-phase power module 20w2 of the second power module group P2 is connected to the second W-phase coil 17w2 of the second coil group C2.

Each power module 20 includes two arm elements, that is, a lower arm element 21 and an upper arm element 22, serving as switching elements. In each phase power module 20, when one of the lower arm element 21 and the upper arm element 22 is opened, the other of the lower arm element 21 and the upper arm element 22 is closed. Therefore, a three-phase alternating current is supplied to the motor 3.

Figure 5:
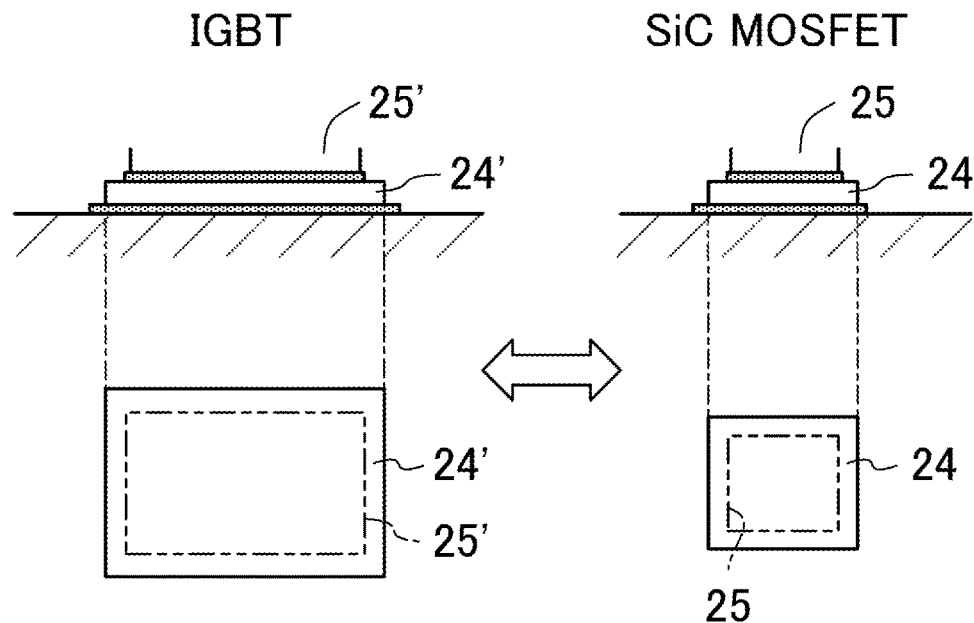
FIG. 5 shows a comparison between a SiC-MOSFET and an IGBT.

Here, each power module 20 includes a SiC-MOSFET. FIG. 5 shows a comparison between a SiC-MOSFET and an IGBT. The SiC-MOSFET is a MOSFET (metal-oxide-semiconductor field-effect transistor) including silicon carbide (SiC), and constitutes a chip 24 including the lower arm element 21 and the upper arm element 22 and, for example, other control elements. A lower surface of the chip 24 is soldered and fixed to a silicon substrate. A copper block 25, serving as a heat transfer block, is soldered and fixed to an upper surface of the chip 24. This also applies to the IGBT (insulated gate bipolar transistor).

As shown in FIG. 5, a surface area of the chip 24 constituted by the SiC-MOSFET is smaller than a surface area of a chip 24' constituted by the IGBT. Therefore, the size of the copper block 25 disposed on an upper side of the SiC-MOSFET (chip) 24 is smaller than the size of a copper block 25' disposed on an upper side of the IGBT (chip) 24'. The SiC-MOSFET has better heat resistance than the IGBT.

Figure 6:
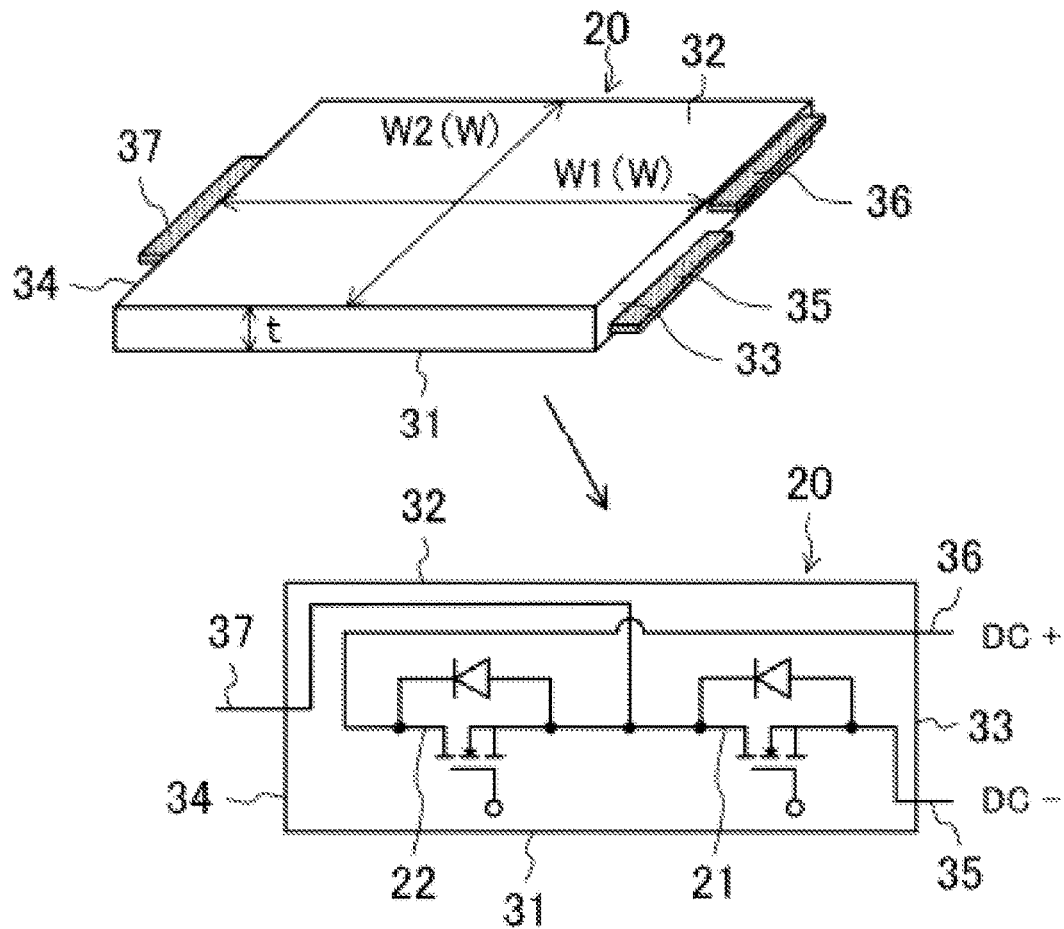
FIG. 6 is a perspective view and a circuit diagram of a detailed structure of a power module.

FIG. 6 is a perspective view and a circuit diagram of a detailed structure of a power module 20. Each power module 20 has a flat shape having a wide width. Specifically, each power module 20 is longer in a width direction W than in a thickness direction t. Each power module 20 has a substantially parallelepiped shape. The width direction W includes a first width direction W1 and a second width direction W2 orthogonal to each other. Hereunder, one side of the power module 20 in the thickness direction may be the lower side and an opposite side of the power module 20 in the thickness direction may be the upper side.

The power module 20 has a lower surface 31 on the lower side (one surface side, the one side in the thickness direction). The power module 20 has an upper surface 32 on the upper side. The power module 20 has a first end surface 33 on one side in the first width direction W1. The power module 20 has a second end surface 34 on an opposite side in the first width direction W1.

A negative-electrode-side input terminal 35 is connected to a lower side of the first end surface 33 and on one side in the second width direction W2. A positive-electrode-side input terminal 36 is connected to an upper side of the first end surface 33 and on an opposite side in the second width direction W2. The negative-electrode-side input terminal 35 and the positive-electrode-side input terminal 36 are disposed apart from each other in an up-down direction (thickness direction). An output terminal 37 is connected to a central portion of the second end surface 34.

The lower arm element 21 and the upper arm element 22 are accommodated inside a package (box body) of the power module 20. The negative-electrode-side input terminal 35 is connected to the lower arm element 21. The positive-electrode-side input terminal 36 is connected to the upper arm element 22. The output terminal 37 is connected between the lower arm element 21 and the upper arm element 22.

Figure 7:
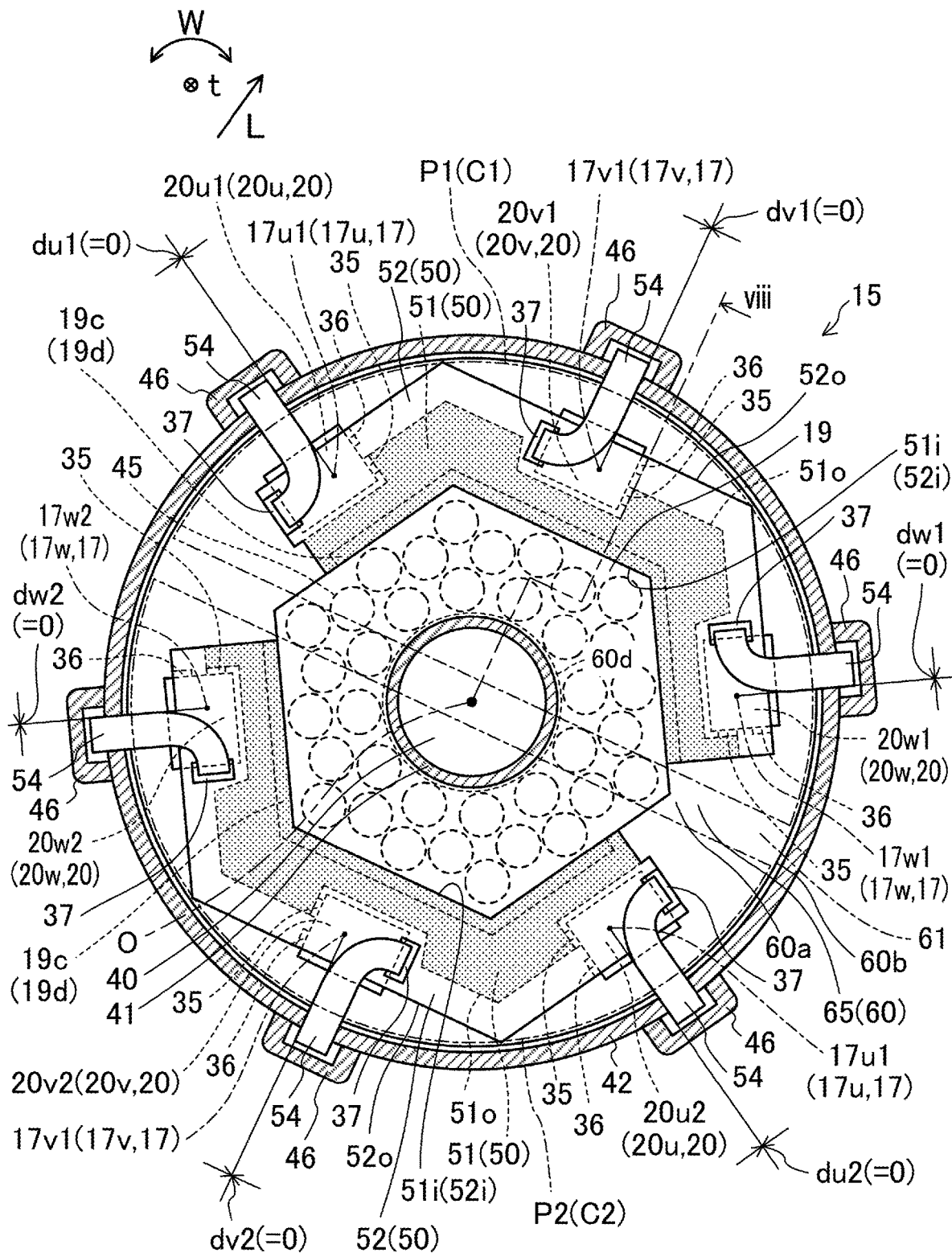
FIG. 7 is a cross sectional view of the inverter when seen from a side opposite to the motor.
Figure 8:
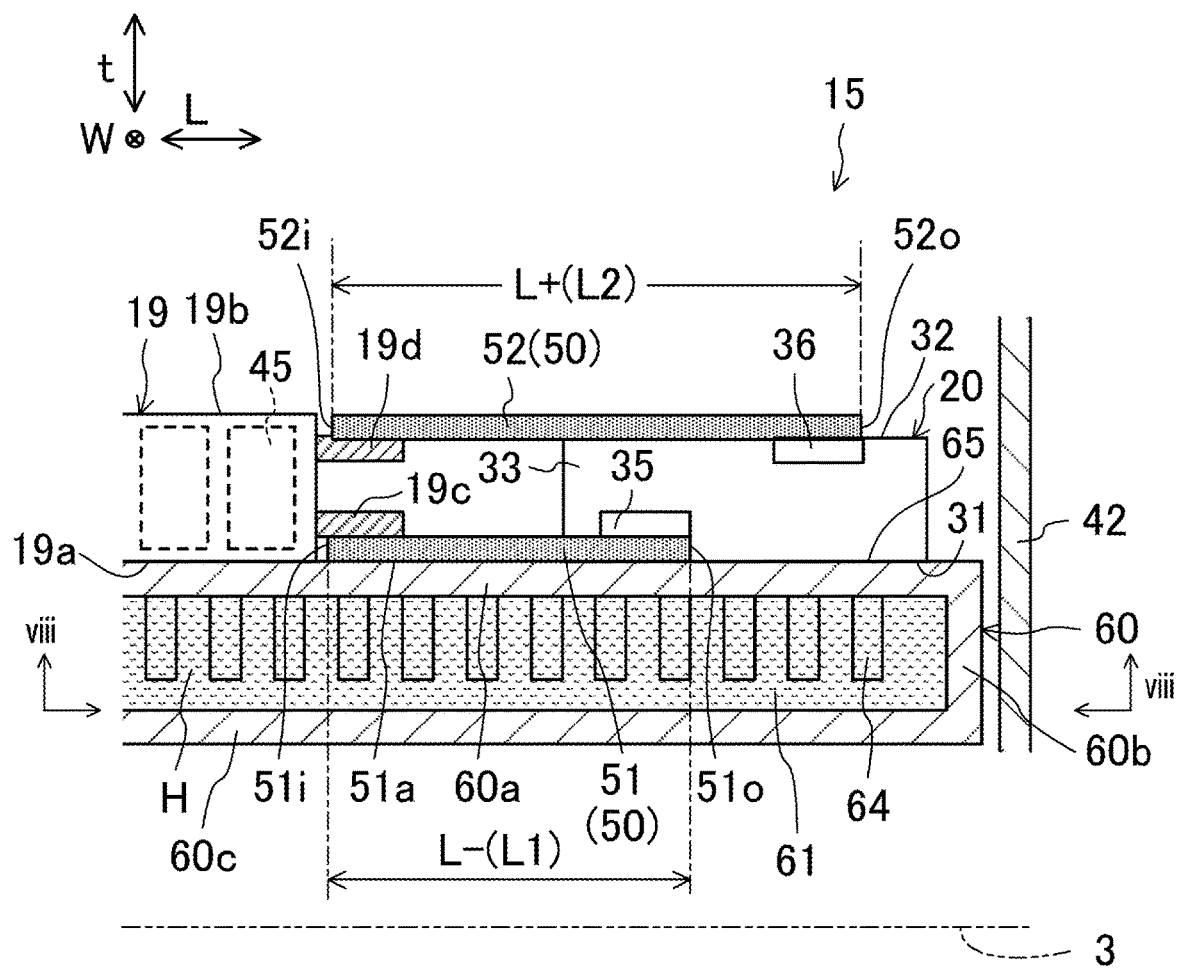
FIG. 8 is a vertical sectional view of the inverter.

FIG. 7 is a cross sectional view of the inverter 15 when seen from a side opposite to the motor 3. FIG. 8 is a vertical sectional view of the inverter 15 along line VIII-VIII. As shown in FIG. 7, an axial through hole 40 through which the rotation shaft 3a of the motor 3 passes is provided in the center of the inverter 15. A cylindrical boss portion 41 is formed around the axial through hole 40. The smoothing capacitor 19 is disposed at a center O of the inverter 15. The smoothing capacitor 19 is disposed along the boss portion 41. The smoothing capacitor 19 is formed with a hollow polygonal shape having an axial through hole through which the rotation shaft 3a passes.

Each power module 20 (the first U-phase power module 20u1, the first V-phase power module 20v1, the first W-phase power module 20w1, the second U-phase power module 20u2, the second V-phase power module 20v2, and the second W-phase power module 20w2) are disposed on an outer peripheral side with respect to the smoothing capacitor 19. On the outer peripheral side with respect to the smoothing capacitor 19, each power module 20 is disposed side by side in the peripheral direction of the motor 3. The input terminals 35 and 36 (the first end surface 33) and the output terminal 37 (the second end surface 34) of each power module 20 face the peripheral direction of the motor 3 (the inverter 15). Each power module 20 is disposed so that the thickness direction t coincides with the axial direction of the motor 3. The smoothing capacitor 19 and each power module 20 are disposed in a space defined by an outer peripheral wall portion 42 and the boss portion 41 of the inverter 15.

Each of the phase power modules 20u1, 20v1, and 20w1 of the first power module group P1 is disposed on one side in the radial direction of the motor 3 (the inverter 15). Each of the phase power modules 20u2, 20v2, and 20w2 of the second power module group P2 is disposed on an opposite side in the radial direction of the motor 3.

The first U-phase power module 20u1 of the first power module group P1 and the second U-phase power module 20u2 of the second power module group P2 oppose each other in the radial direction of the motor 3 (the inverter 15). The first V-phase power module 20v1 of the first power module group P1 and the second V-phase power module 20v2 of the second power module group P2 oppose each other in the radial direction of the motor 3. The first W-phase power module 20w1 of the first power module group P1 and the second W-phase power module 20w2 of the second power module group P2 oppose each other in the radial direction of the motor 3.

As shown in FIGS. 7 and 8, a heat sink 60 is provided on a motor 3 side of the inverter 15. The heat sink 60 is primarily used for cooling each power module 20. The heat sink 60 is disposed between the outer peripheral wall portion 42 and the boss portion 41 of the inverter 15. The heat sink 60 has an upper wall portion 60a, an outer peripheral wall portion 60b, a lower wall portion 60c, and an inner peripheral wall portion 60d.

An upper surface 65 of the upper wall portion 60a of the heat sink 60 constitutes a placement surface orthogonal to the axial direction of the motor 3 (may hereunder be referred to as "placement surface 65"). The lower surface 31 of each power module 20 faces the motor 3. Specifically, the lower surface 31 of each power module 20 is placed side by side on the same placement surface 65.

As shown in FIGS. 7 and 8, the smoothing capacitor 19 is one in which an assembly of a plurality of columnar capacitors 45 is covered by a flat plate from both sides in the thickness direction. The smoothing capacitor 19 has a lower surface 19a on a lower side (one surface side, the one side in the thickness direction). The smoothing capacitor 19 has an upper surface 19b on a side opposite to the lower surface 19a. The lower surface 19a and the upper surface 19b of the smoothing capacitor 19 are constituted by flat plates. The lower surface 19a of the smoothing capacitor 19 faces the motor 3. Specifically, the lower surface 19a of the smoothing capacitor 19 is placed on the placement surface 65.

As shown in FIGS. 7 and 8, the smoothing capacitor 19 and each power module 20 are connected to each other by a negative-electrode-side busbar 51 and a positive-electrode-side busbar 52, serving as input busbars 50 (may hereunder be simply referred to as "busbars 50"). The negative-electrode-side busbar 51 and the positive-electrode-side busbar 52 each have a plate shape. Specifically, the negative-electrode-side busbar 51 and the positive-electrode-side busbar 52 are longer in the width direction W and a length direction L than in the thickness direction t.

As shown in FIG. 7, the negative-electrode-side busbar 51 and the positive-electrode-side busbar 52 are formed with wide widths so as to be extend along the peripheral direction of the motor 3 (the inverter 15). In other words, the negative-electrode-side busbar 51 and the positive-electrode-side busbar 52 are formed with wide widths so as to extend along a direction in which each power module 20 is disposed side by side. The width direction W of the negative-electrode-side busbar 51 and the positive-electrode-side busbar 52 is the peripheral direction of the motor 3 (an arc shape is formed). The negative-electrode-side busbar 51 and the positive-electrode-side busbar 52 each have a fan shape. The length direction L of the negative-electrode-side busbar 51 and the positive-electrode-side busbar 52 is the radial direction of the motor 3.

One end portion 51i of the negative-electrode-side busbar 51 (input busbar 50) is connected to a negative-electrode terminal 19c provided on the lower surface 19a side of the smoothing capacitor 19. The other end portion 51o of the negative-electrode-side busbar 51 (input busbar 50) is connected to a negative-electrode-side input terminal 35 of each power module 20. One end portion 52i of the positive-electrode-side busbar 52 (input busbar 50) is connected to a positive-electrode terminal 19d provided on the upper surface 19b side of the smoothing capacitor 19. An other end portion 52o of the positive-electrode-side busbar 52 (input busbar 50) is connected to a positive-electrode-side input terminal 36 of each power module 20.

The negative-electrode-side busbar 51 has a lower surface 51a on the lower side (one surface side, the one side in the thickness direction). The lower surface 51a of the negative-electrode-side busbar 51 faces the motor 3. Specifically, the lower surface 51a of the negative-electrode-side busbar 51 is placed on the placement surface 65.

As shown in FIG. 7, output busbars 54 are each connected to the output terminal 37 of a corresponding one of the power modules 20. There are a total of six output busbars 54 each corresponding to a corresponding one of the power modules 20u1, 20v1, 20w1, 20u2, 20v2, and 20w2 (the coils 17u1, 17v1, 17w1, 17u2, 17v2, and 17w2). The output busbars 54 are each interposed between the corresponding one of the power modules 20 and a corresponding one of the coils 17. The output busbars 54 each have a plate shape. In addition to the output busbars 54, a wire harness or the like may be interposed between the corresponding one of the power modules 20 and the corresponding one of the coils 17.

Six inverter-side terminal blocks 46 are provided at an outer peripheral portion of the inverter 15. The inverter-side terminal blocks 46 correspond to the respective power modules 20. Specifically, each inverter-side terminal block 46 is disposed at a corresponding peripheral-direction position and at a radial-direction outer side with respect to a corresponding one of the power modules 20.

The output busbars 54 extend up to the respective inverter-side terminal blocks 46. Electrically conductive members (busbars, wire harnesses, or the like) are each interposed between a corresponding one of the inverter-side terminal blocks 46 and a corresponding one of the motor-side terminal blocks 18.

Cooling Path

As shown in FIGS. 7 and 8, the cooling path (cooling jacket) 61 is provided inside the heat sink 60. The cooling path 61 is defined by the upper wall portion 60a, the outer peripheral wall portion 60b, the lower wall portion 60c, and the inner peripheral wall portion 60d. The cooling path 61 is formed with a doughnut shape (ring shape, cylindrical shape) over the entire periphery when seen in the axial direction of the motor 3 (the inverter 15) (see FIG. 7). The rotation shaft 3a of the motor 3 passes through an inner side of the inner peripheral wall portion 60d. As described above, the upper surface of the upper wall portion 60a of the heat sink 60 is the placement surface 65.

The cooling path 61 is provided closer to the motor 3 than the placement surface 65. A cooling medium H flows in the cooling path 61. The cooling medium H is, for example, cooling water or cooling oil.

A plurality of fins 64 are provided inside the heat sink 60 (the cooling path 61). The fins 64 extend downward inside the cooling path 61 from the upper wall portion 60a. That is, the fins 64 are provided closer to the motor 3 than the placement surface 65.

As shown in FIGS. 7 and 8, when seen in the axial direction of the motor 3 (the inverter 15), the cooling path 61 faces the lower surface 31 of each power module 20, the lower surface 51a of the negative-electrode-side busbar 51, and the lower surface 19a of the smoothing capacitor 19.

Similarly, when seen in the axial direction of the motor 3, the fins 64 face the lower surface 31 of each power module 20, the lower surface 51a of the negative-electrode-side busbar 51, and the lower surface 19a of the smoothing capacitor 19.

As shown in FIG. 2, the inlet pipe 62 and the outlet pipe 63 are connected to an upper portion of the outer peripheral portion of the inverter 15. The inlet pipe 62 and the outlet pipe 63 communicate with the cooling path 61. The cooling medium H introduced into the cooling path 61 via the inlet pipe 62 is discharged to the outside via the outlet pipe 63 after having flowed inside the cooling path 61.

Busbar Inductance Sensitivity

Figure 9:
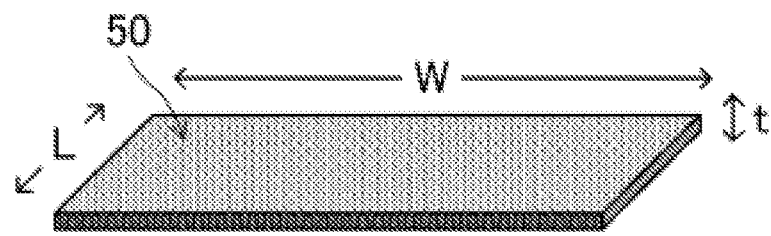
FIG. 9 is a perspective view of a busbar.
Figure 10:
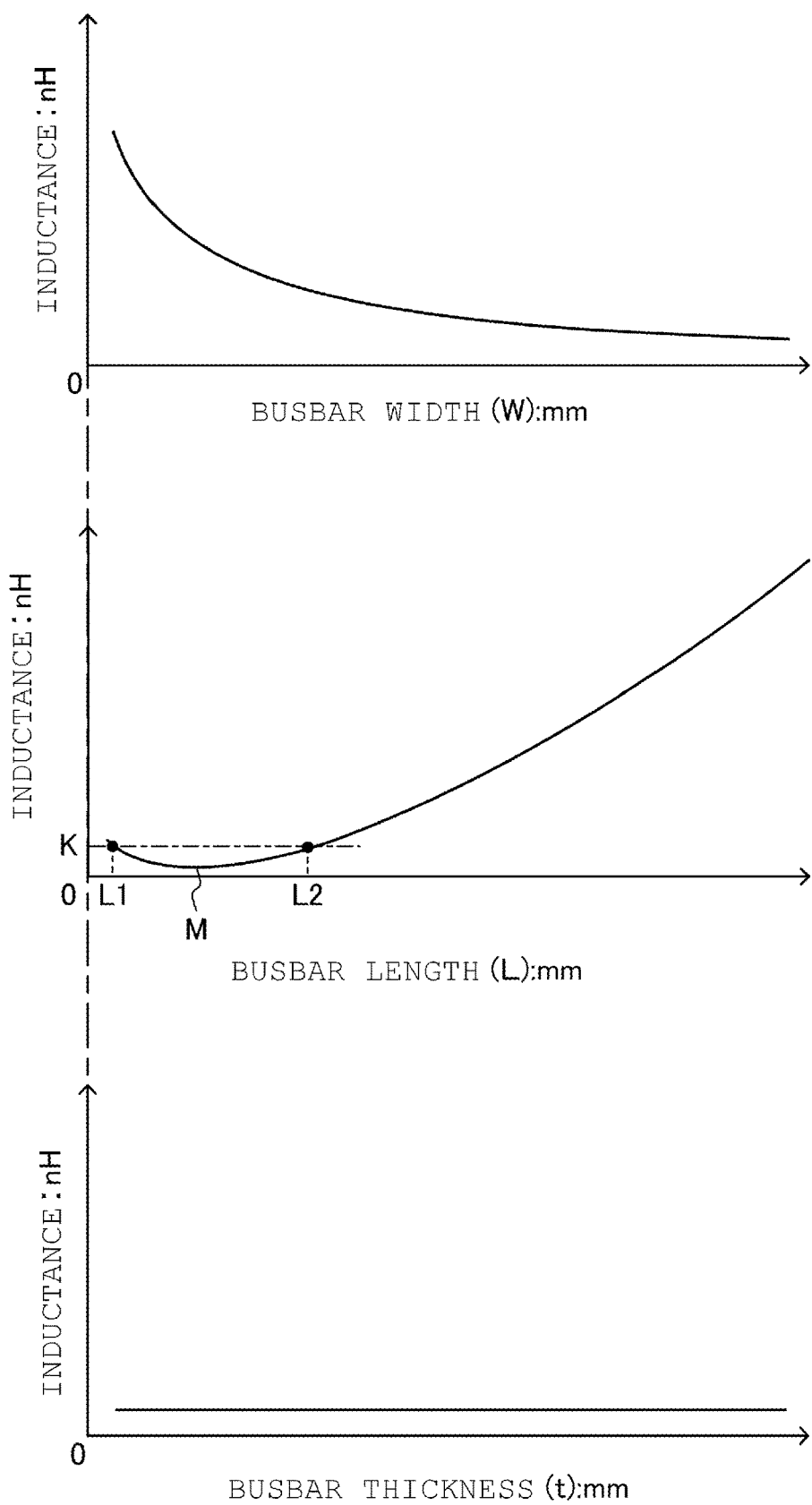
FIG. 10 shows graphs showing the relationship between size and inductance sensitivity of busbar.

FIG. 9 is a perspective view of a busbar 50. FIG. 10 shows graphs showing the relationship between size and inductance sensitivity of busbar 50. As a result of assiduous studies, the inventor of the present application and others have found the following with regard to the relationship between the size and inductance sensitivity of busbar 50.

As shown in FIGS. 9 and 10, the larger a width W (mm) of busbar 50, the smaller an inductance sensitivity (nH) of busbar 50.

Basically, the larger a length L (mm) of busbar 50, the larger the inductance sensitivity (nH) of busbar 50. However, as shown in the middle graph in FIG. 10, a minimum value (inflection point) M exists in the relationship between the length L (mm) and the inductance sensitivity (nH) of busbar 50. Therefore, even if lengths L differ from each other, the inductance sensitivity (nH) may become the same. Specifically, the inductance sensitivity (nH) of busbar 50 (51, 52) is a function of the length L (mm) extending from the one end portion 51i or 52i of busbar 50 (51, 52) (the terminal 19c or 19d of the smoothing capacitor 19) to the other end portion 51o or 52o of busbar 50 (51, 52) (the input terminal 35 or 36 of each power module 20). The function has the minimum value M so that the inductance sensitivity K (nH) becomes the same at a first length L1 (mm) and a second length L2 (mm) that differ from each other. The second length L2 (mm) is larger than the first length L1 (mm).

Even if a thickness t (mm) of busbar 50 changes, the inductance sensitivity (nH) of busbar 50 does not change.

As shown in FIG. 7, the width of the negative-electrode-side busbar 51 and the width of the positive-electrode-side busbar 52 are substantially the same. As shown in FIG. 8, a length L− of the negative-electrode-side busbar 51 and a length L+ of the positive-electrode-side busbar 52 differ from each other. The length L− of the negative-electrode-side busbar 51 corresponds to the first length L1. The length L+ of the positive-electrode-side busbar 52 corresponds to the second length L2. The length L+ of the positive-electrode-side busbar 52 (the second length L2) is larger than the length L− of the negative-electrode-side busbar 51 (the first length L1). However, due to the existence of the minimum value M above, the inductance sensitivity of the negative-electrode-side busbar 51 and the inductance sensitivity of the positive-electrode-side busbar 52 are equal to each other.

Positional Relationship between Power Module and Coil

As shown in FIG. 7, when seen in the axial direction of the motor 3 (the inverter 15), the first U-phase power module 20u1 of the first power module group P1 is disposed at a position overlapping the first U-phase coil 17u1 of the first coil group C1. When seen in the axial direction of the motor 3, the first V-phase power module 20v1 of the first power module group P1 is disposed at a position overlapping the first V-phase coil 17v1 of the first coil group C1. When seen in the axial direction of the motor 3, the first W-phase power module 20w1 of the first power module group P1 is disposed at a position overlapping the first W-phase coil 17w1 of the first coil group C1.

As shown in FIG. 7, when seen in the axial direction of the motor 3 (the inverter 15), the second U-phase power module 20u2 of the second power module group P2 is disposed at a position overlapping the second U-phase coil 17u2 of the second coil group C2. When seen in the axial direction of the motor 3, the second V-phase power module 20v2 of the second power module group P2 is disposed at a position overlapping the second V-phase coil 17v2 of the second coil group C2. When seen in the axial direction of the motor 3, the second W-phase power module 20w2 of the second power module group P2 is disposed at a position overlapping the second W-phase coil 17w2 of the second coil group C2.

Specifically, when seen in the axial direction of the motor 3 (the inverter 15), at least a part of each power module 20 is disposed so as to overlap at least a part of the corresponding one of the coils 17.

That is, as shown in FIG. 7, when seen in the axial direction of the motor 3 (the inverter 15), a distance du1 between the first U-phase power module 20u1 of the first power module group P1 and the first U-phase coil 17u1 of the first coil group C1, a distance dv1 between the first V-phase power module 20v1 of the first power module group P1 and the first V-phase coil 17v1 of the first coil group C1, and a distance dw1 between the first W-phase power module 20w1 of the first power module group P1 and the first W-phase coil 17w1 of the first coil group C1 are equal to each other.

Similarly, as shown in FIG. 7, when seen in the axial direction of the motor 3 (the inverter 15), a distance du2 between the second U-phase power module 20u2 of the second power module group P2 and the second U-phase coil 17u2 of the second coil group C2, a distance dv2 between the second V-phase power module 20v2 of the second power module group P2 and the second V-phase coil 17v2 of the second coil group C2, and a distance dw2 between the second W-phase power module 20w2 of the second power module group P2 and the second W-phase coil 17w2 of the second coil group C2 are equal to each other.

Further, as shown in FIG. 7, when seen in the axial direction of the motor 3 (the inverter 15), the distance du1 between the first U-phase power module 20u1 of the first power module group P1 and the first U-phase coil 17u1 of the first coil group C1 and the distance du2 between the second U-phase power module 20u2 of the second power module group P2 and the second U-phase coil 17u2 of the second coil group C2 are equal to each other. When seen in the axial direction of the motor 3, the distance dv1 between the first V-phase power module 20v1 of the first power module group P1 and the first V-phase coil 17v1 of the first coil group C1 and the distance dv2 between the second V-phase power module 20v2 of the second power module group P2 and the second V-phase coil 17v2 of the second coil group C2 are equal to each other. When seen in the axial direction of the motor 3, the distance dw1 between the first W-phase power module 20w1 of the first power module group P1 and the first W-phase coil 17w1 of the first coil group C1 and the distance dw2 between the second W-phase power module 20w2 of the second power module group P2 and the second W-phase coil 17w2 of the second coil group C2 are equal to each other.

The distances du1, dv1, dw1, du2, dv2, and dw2 are all zero. Any standard may be set for the distances du1, dv1, dw1, du2, dv2, and dw2.

Operational Effects of First Embodiment

According to the present embodiment, since the first power module group P1 and the second power module group P2 of the inverter 15 are connected in parallel, the output of the motor 3 can be increased.

Since each power module 20 is placed side by side on the same placement surface 65 orthogonal to the axial direction of the motor 3, the axial-direction length of the inverter 15 can be suppressed from being increased even though the number of power modules 20 has been increased.

Since the motor 3 and the inverter 15 are disposed adjacent to each other in the axial direction of the motor 3, the distance between the phase power modules 20 and the respective phase coils 17 can be reduced. Therefore, inductances of electrical paths (including the output busbars 54) extending from the phase power modules 20 to the respective phase coils 17 can be reduced.

Further, in at least the first power module group P1 and the first coil group C1, when seen in the axial direction of the motor 3, the distances du1, dv1, and dw1 between a corresponding one of the phase power modules 20u1, 20v1, and 20w1 and a corresponding one of the phase coils 17u1, 17v1, and 17w1 are equal to each other between the U phase, the V phase, and the W phase. Therefore, in at least the first power module group P1 and the first coil group C1, the inductances of the electrical paths (including the output busbars 54) extending from the phase power modules 20u1, 20v1, and 20w1 to the respective phase coils 17u1, 17v1, and 17w1 can be equalized between the U phase, the V phase, and the W phase.

Accordingly, while suppressing the drive unit A including the motor 3 and the inverter 15 from increasing in size, the output of the motor 3 is increased, and the inductances of the electrical paths extending from the phase power modules 20 to the respective phase coils 17 can be reduced and equalized.

Even in the second power module group P2 and the second coil group C2, as in the first power module group P1 and the first coil group C1, when seen in the axial direction of the motor 3, the distances du2, dv2, and dw2 between a corresponding one of the phase power modules 20u2, 20v2, and 20w2 and a corresponding one of the phase coils 17u2, 17v2, and 17w2 are equal to each other between the U phase, the V phase, and the W phase. Therefore, even in the second power module group P2 and the second coil group C2, as in the first power module group P1 and the first coil group C1, inductances of electrical paths (including the output busbars 54) extending from the phase power modules 20u2, 20v2, and 20w2 to the respective phase coils 17u2, 17v2, and 17w2 can be equalized between the U phase, the V phase, and the W phase.

Further, between the first power module group P1 and the first coil group C1 and the second power module group P2 and the second coil group C2, the inductances of the electrical paths (including the output busbars 54) extending from the phase power modules 20u1, 20v1, 20w1, 20u2, 20v2, and 20w2 to the respective phase coils 17u1, 17v1, 17w1, 17u2, 17v2, and 17w2 can be equalized.

When seen in the axial direction of the motor 3, the phase power modules 20u1, 20v1, and 20w1 of the first power module group P1 are disposed at positions overlapping the respective phase coils 17u1, 17v1, and 17w1 of the first coil group C1. Therefore, in the first power module group P1 and the first coil group C1, the distances du1, dv1, and dw1 between the corresponding one of the phase power modules 20u1, 20v1, and 20w1 and the corresponding one of the phase coils 17u1, 17v1, and 17w1 can be reduced. Consequently, in the first power module group P1 and the first coil group C1, the inductances of the electrical paths (including the output busbars 54) extending from the phase power modules 20u1, 20v1, and 20w1 to the respective phase coils 17u1, 17v1, and 17w1 can be reduced.

When seen in the axial direction of the motor 3, the phase power modules 20u2, 20v2, and 20w2 of the second power module group P2 are disposed at positions overlapping the respective phase coils 17u2, 17v2, 17w2 of the second coil group C2. Therefore, even in the second power module group P2 and the second coil group C2, as in the first power module group P1 and the first coil group C1, the distances du2, dv2, and dw2 between the corresponding one of the phase power modules 20u2, 20v2, and 20w2 and the corresponding one of the phase coils 17u2, 17v2, and 17w2 can be reduced. Consequently, even in the second power module group P2 and the second coil group C2, as in the first power module group P1 and the first coil group C1, the inductances of the electrical paths (including the output busbars 54) extending from the phase power modules 20u2, 20v2, and 20w2 to the respective phase coils 17u2, 17v2, and 17w2 can be reduced.

In the motor 3 (in particular, a concentrated winding type in which the number of coils 17 is even), coils 17 of the same phase are often disposed so as to oppose each other in the radial direction of the motor 3 (see FIG. 3). According to the present embodiment, as with the coils 17 of the same phase, power modules 20 of the same phase are disposed so as to oppose each other in the radial direction of the motor 3. Therefore, the phase power modules 20 are easily positioned with respect to the respective phase coils 17.

Since the smoothing capacitor 19 and each power module 20 are placed on the same placement surface 65 orthogonal to the axial direction of the motor 3, such a structure is advantageous in terms of suppressing an increase in the axial-direction length of the inverter 15. Further, since the distance between the smoothing capacitor 19 and each power module 20 can be reduced, inductances of the input busbars 50 (the negative-electrode-side busbar 51 and the positive-electrode-side busbar 52) that connect the smoothing capacitor 19 and each power module 20 to each other can be reduced.

Since each power module 20 is disposed side by side in the peripheral direction of the motor 3 on the outer peripheral side with respect to the smoothing capacitor 19, the distances between the smoothing capacitor 19 and each power module 20 can be made equal to each other. Further, since the input busbars 50 (the negative-electrode-side busbar 51 and the positive-electrode-side busbar 52) are formed with wide widths so as to be extend along the peripheral direction of the motor 3, in the input busbars 50, inductances of electrical paths between the smoothing capacitor 19 and each power module 20 can be equalized.

In the input busbars 50 (the negative-electrode-side busbar 51 and the positive-electrode-side busbar 52) that connect the smoothing capacitor 19 and each power module 20 to each other, by using the minimum value (the inflection point) M (see FIG. 10), even though the length L− of the negative-electrode-side busbar 51 (the first length L1) and the length L+ of the positive-electrode-side busbar 52 (the second length L2) differ from each other, the inductance of the negative-electrode-side busbar 51 and the inductance of the positive-electrode-side busbar 52 can be equalized with respect to each other.

As shown by an alternate long and short dash lines in FIG. 1, in the related art, an inverter 15' is often disposed near a second battery unit 12b' of a battery 12'. According to the present embodiment, since the inverter 15 can be disposed adjacent to the motor 3 in the axial direction, the inverter 15 no longer needs to be disposed near the second battery unit 12b. Therefore, the layout of the second battery unit 12b can be provided with greater freedom, and the second battery unit 12b can be increased in size.

When seen in the axial direction of the motor 3, the phase power modules 20u1, 20v1, and 20w1 of the first power module group P1 are disposed at positions overlapping the respective phase coils 17u1, 17v1, and 17w1 of the first coil group C1. Therefore, in the first power module group P1 and the first coil group C1, this is advantageous in terms of equalizing the inductances of the electrical paths extending from the phase power modules 20u1, 20v1, and 20w1 to the respective phase coils 17u1, 17v1, and 17w1 between the U phase, the V phase, and the W phase.

When seen in the axial direction of the motor 3, the phase power modules 20u2, 20v2, and 20w2 of the second power module group P2 are disposed at positions overlapping the respective phase coils 17u2, 17v2, and 17w2 of the second coil group C2. Therefore, even in the second power module group P2 and the second coil group C2, as in the first power module group P1 and the first coil group C1, this is advantageous in terms of equalizing the inductances of the electrical paths extending from the phase power modules 20u2, 20v2, and 20w2 to the respective phase coils 17u2, 17v2, and 17w2 between the U phase, the V phase, and the W phase.

Modification 1 of First Embodiment

Figure 11:
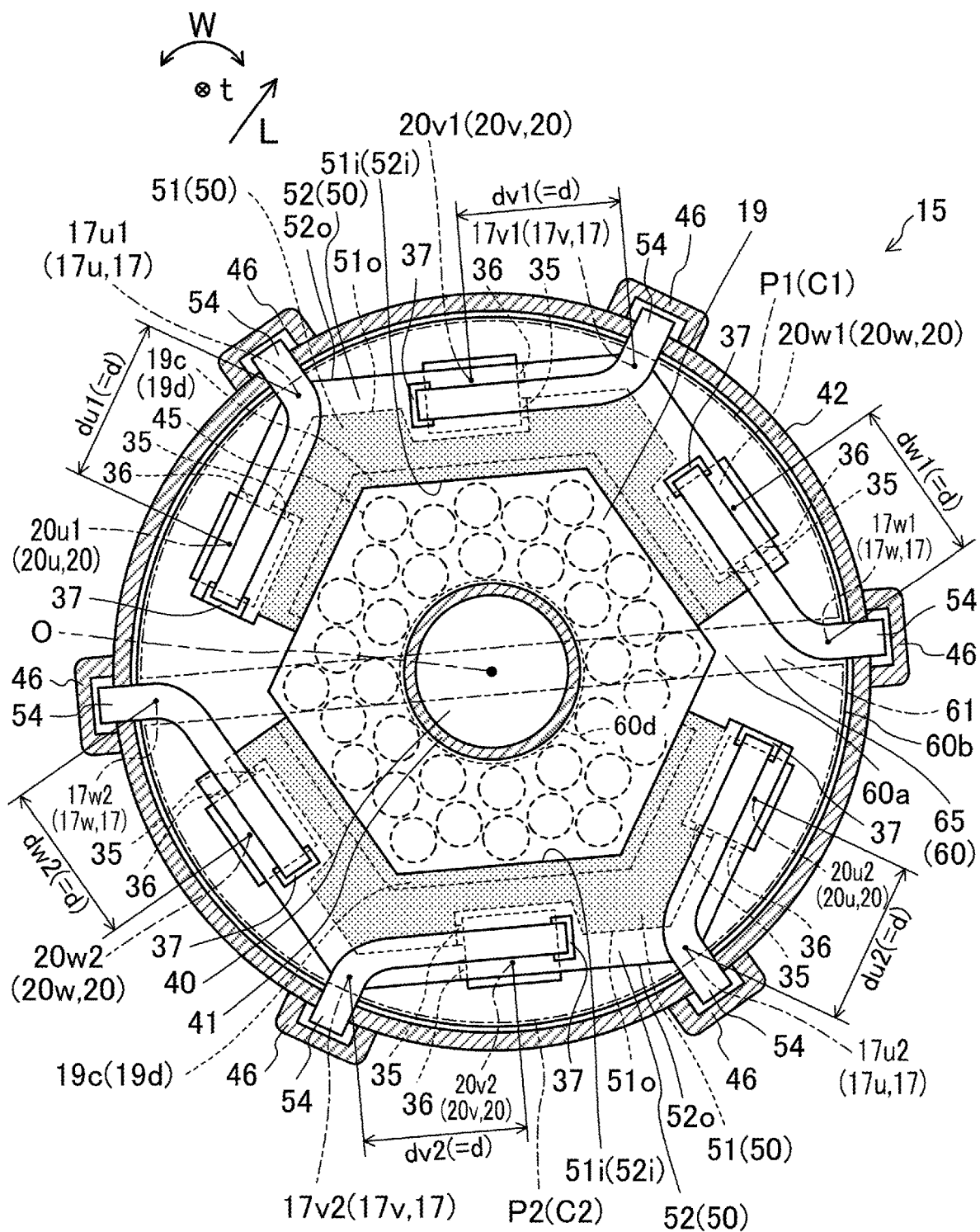
FIG. 11 is a view, corresponding to FIG. 7, of Modification 1 of the first embodiment, and is a cross sectional view of an inverter when seen from a side opposite to a motor.

FIG. 11 is a view, corresponding to FIG. 7, of Modification 1 of the first embodiment. According to the present modification, in the first power module group P1 and the first coil group C1 and in the second power module group P2 and the second coil group C2, when seen in the axial direction of the motor 3, the phase power modules 20u1, 20v1, 20w1, 20u2, 20v2, and 20w2 are disposed at locations that do not overlap the respective phase coils 17u1, 17v1, 17w1, 17u2, 17v2, and 17w2. Specifically, when seen in the axial direction of the motor 3, the phase power modules 20u1, 20v1, 20w1, 20u2, 20v2, and 20w2 are displaced from the respective phase coils 17u1, 17v1, 17w1, 17u2, 17v2, and 17w2 in the peripheral direction of the motor 3.

When seen in the axial direction of the motor 3, the distances du1, dv1, dw1, du2, dv2, and dw2 between the corresponding one of the phase power modules 20u1, 20v1, 20w1, 20u2, 20v2, and 20w2 and the corresponding one of the phase coils 17u1, 17v1, 17w1, 17u2, 17v2, and 17w2 are equal to each other, and are d (>0).

Modification 2 of First Embodiment

Figure 12:
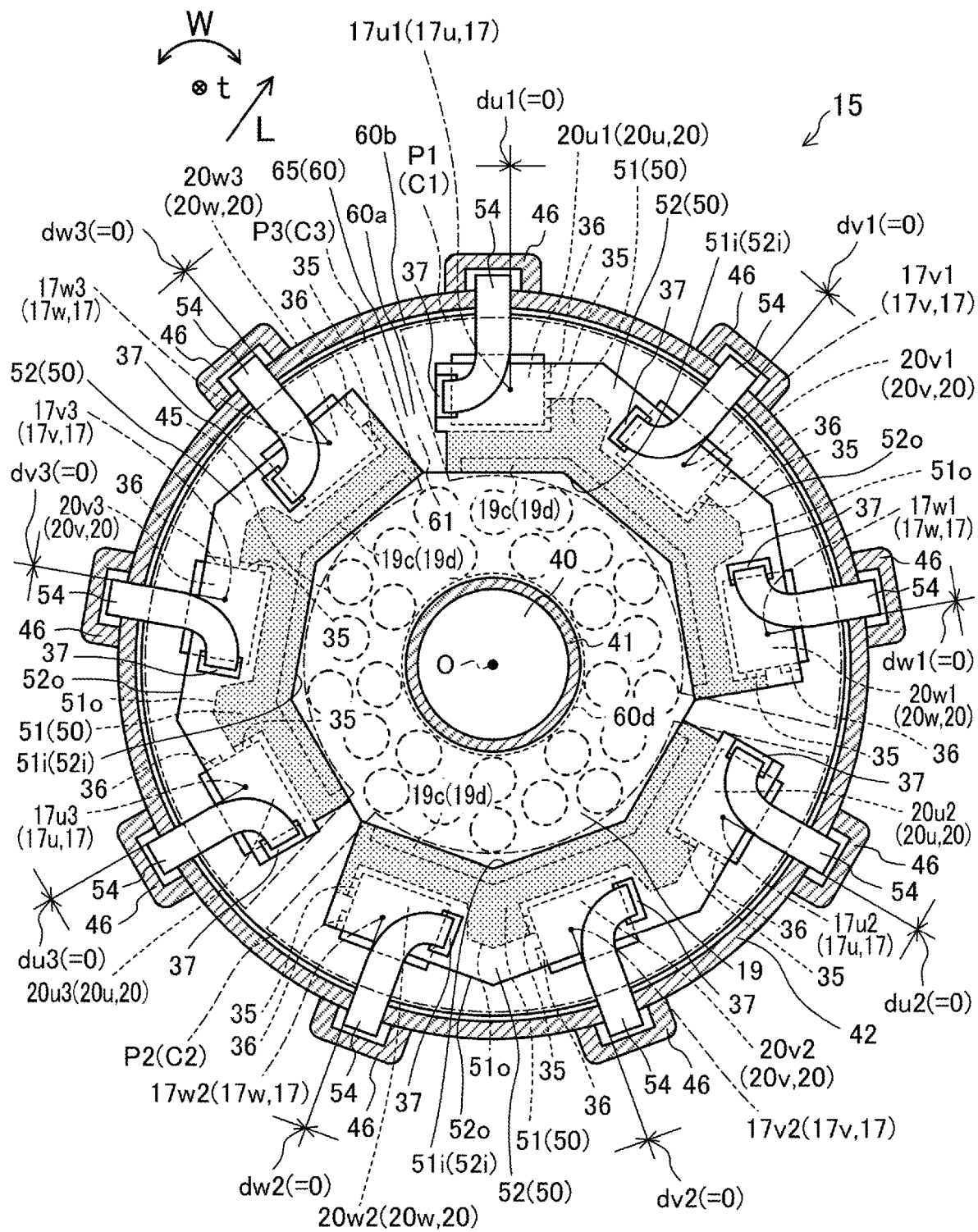
FIG. 12 is a view, corresponding to FIG. 7, of Modification 2 of the first embodiment, and is a cross sectional view of an inverter when seen from a side opposite to a motor.

FIG. 12 is a view, corresponding to FIG. 7, of Modification 2 of the first embodiment. According to the present modification, the stator of the motor 3 is further provided with a third U-phase coil 17u3, serving as a U-phase coil 17u, a third V-phase coil 17v3, serving as a V-phase coil 17v, and a third W-phase coil 17w3, serving as a W-phase coil 17w. The third U-phase coil 17u3, the third V-phase coil 17v3, and the third W-phase coil 17w3 constitute a third coil group C3.

The inverter 15 further includes a third U-phase power module 20u3, serving as a U-phase power module 20u, a third V-phase power module 20v3, serving as a V-phase power module 20v, and a third W-phase power module 20w3, serving as a W-phase power module 20w. The third U-phase power module 20u3, the third V-phase power module 20v3, and the third W-phase power module 20w3 constitute a third power module group P3.

When seen in the axial direction of the motor 3, the phase power modules 20u1, 20v1, 20w1, 20u2, 20v2, 20w2, 20u3, 20v3, and 20w3 are disposed at positions overlapping the respective phase coils 17u1, 17v1, 17w1, 17u2, 17v2, 17w2, 17u3, 17v3, and 17w3. When seen in the axial direction of the motor 3, the distances du1, dv1, dw1, du2, dv2, dw2, du3, dv3, and dw3 between a corresponding one of the phase power modules 20u1, 20v1, 20w1, 20u2, 20v2, 20w2, 20u3, 20v3, and 20w3 and a corresponding one of the phase coils 17u1, 17v1, 17w1, 17u2, 17v2, 17w2, 17u3, 17v3, and 17w3 are equal to each other, and are zero.

According to the present modification, the output of the motor 3 can be further increased by connecting the first power module group P1, the second power module group P2, and the third power module group P3 by three parallel connection.

Modification 3 of First Embodiment

Figure 13A:
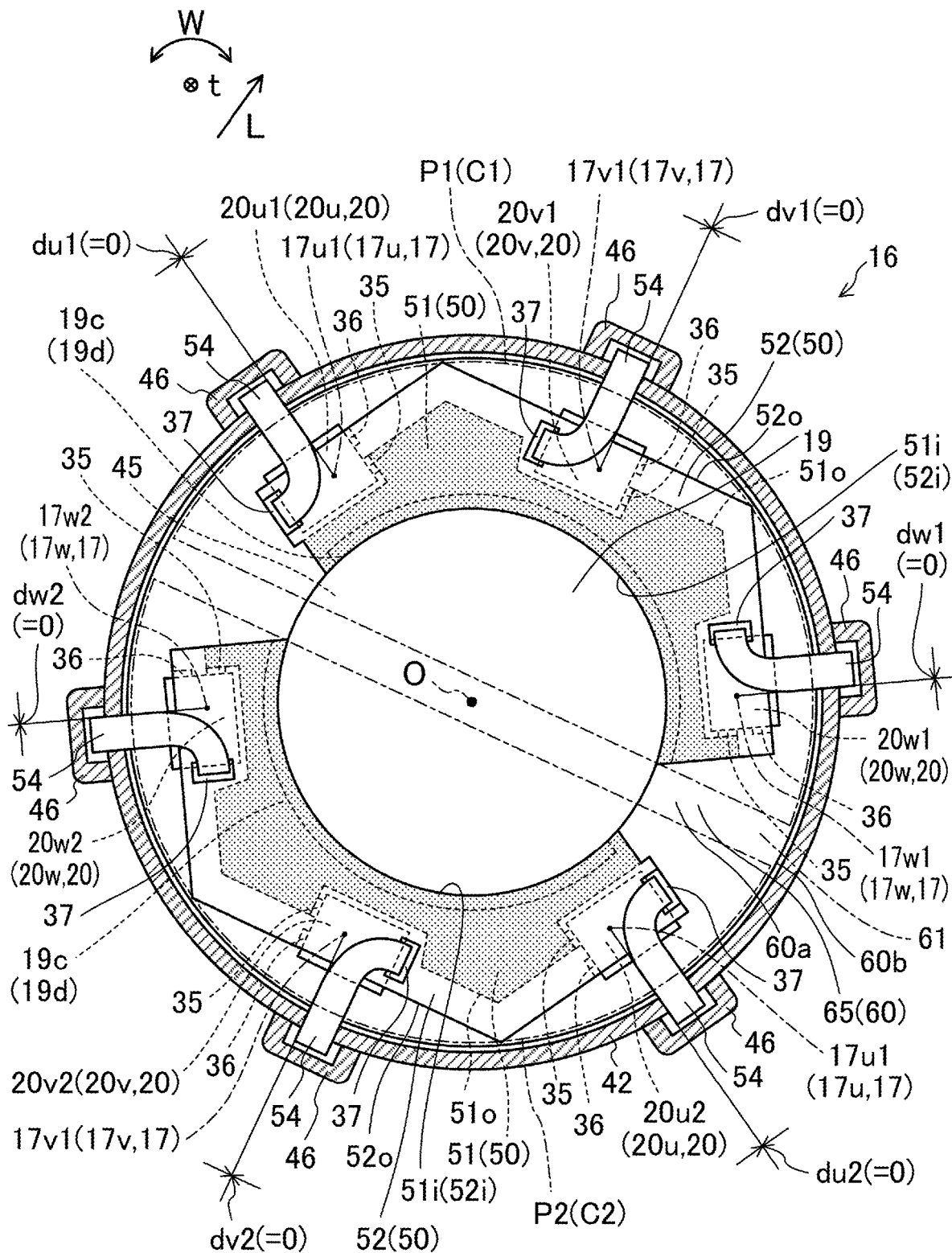
FIG. 13A is a view, corresponding to FIG. 7, of Modification 3 of the first embodiment, and is a cross sectional view of an inverter when seen from a side opposite to a motor.

FIG. 13A is a view, corresponding to FIG. 7, of Modification 3 of the first embodiment. The inverters 16 according to the present modification are disposed adjacent to the respective in-wheel motors 14 in the axial direction of the in-wheel motors 14 (see FIG. 1). The inverters 16 do not have an axial through hole 40 and a boss portion 41. The smoothing capacitor 19 has a columnar shape. The smoothing capacitor 19 does not have an axial through hole.

Modification 4 of First Embodiment

Figure 13B:
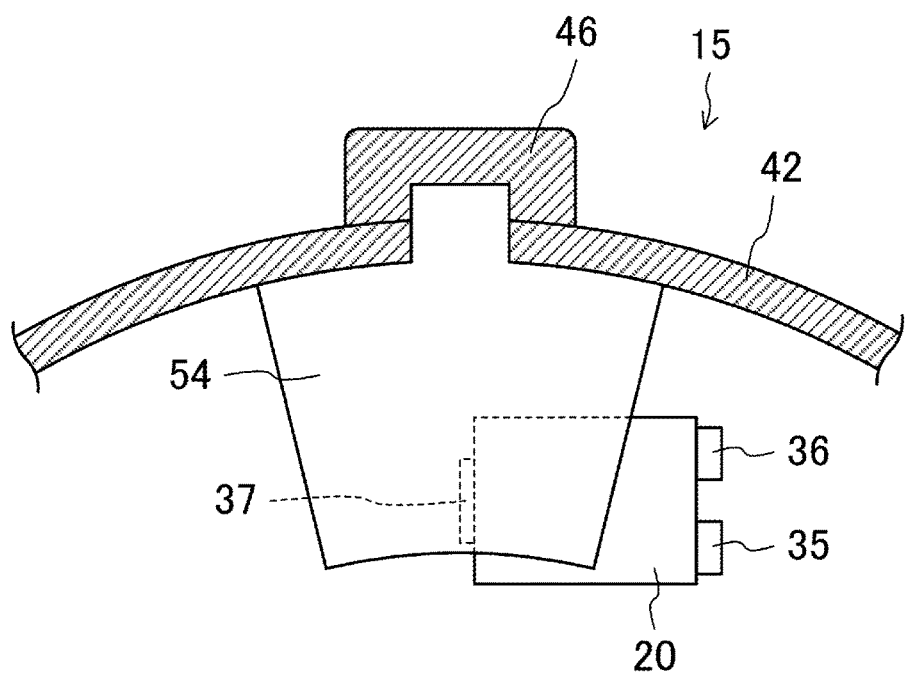
FIG. 13B shows an output busbar according to Modification 4 of the first embodiment.

FIG. 13B shows an output busbar 54 according to Modification 4 of the first embodiment. In the present modification, each output busbar 54 is formed with a wide width so as to extend along the peripheral direction of the motor 3. In other words, the width direction of each output busbar 54 is the peripheral direction (an arc shape is formed). Each output busbar 54 has a fan shape. Therefore, since each output busbar 54 is easily formed with a wide width, the inductance of each output busbar 54 is easily reduced.

Other Modifications of First Embodiment

The number of coil groups of the motor 3 and the number of power module groups of the inverter 15 may differ from each other. For example, when the number of coil groups of the motor 3 is three (the number of coils is nine), the number of power module groups of the inverter 15 may be two (the number of power modules may be six). In contrast, when the number of coil groups of the motor 3 is two (the number of coils is six), the number of power module groups of the inverter 15 may be three (the number of power modules 20 may be nine).

Although not shown, in the motor 3, the U-phase coils 17u, the V-phase coils 17v, and the W-phase coils 17w may be subjected to distributed winding.

For the input busbars 50, the length L− of the negative-electrode-side busbar 51 may be the second length L2, and the length L+ of the positive-electrode-side busbar 52 may be the first length L1.

The placement surface 65 may include a plurality of surfaces that are positioned in the same plane orthogonal to the axial direction of the motor 3.

Second Embodiment

Figure 14:
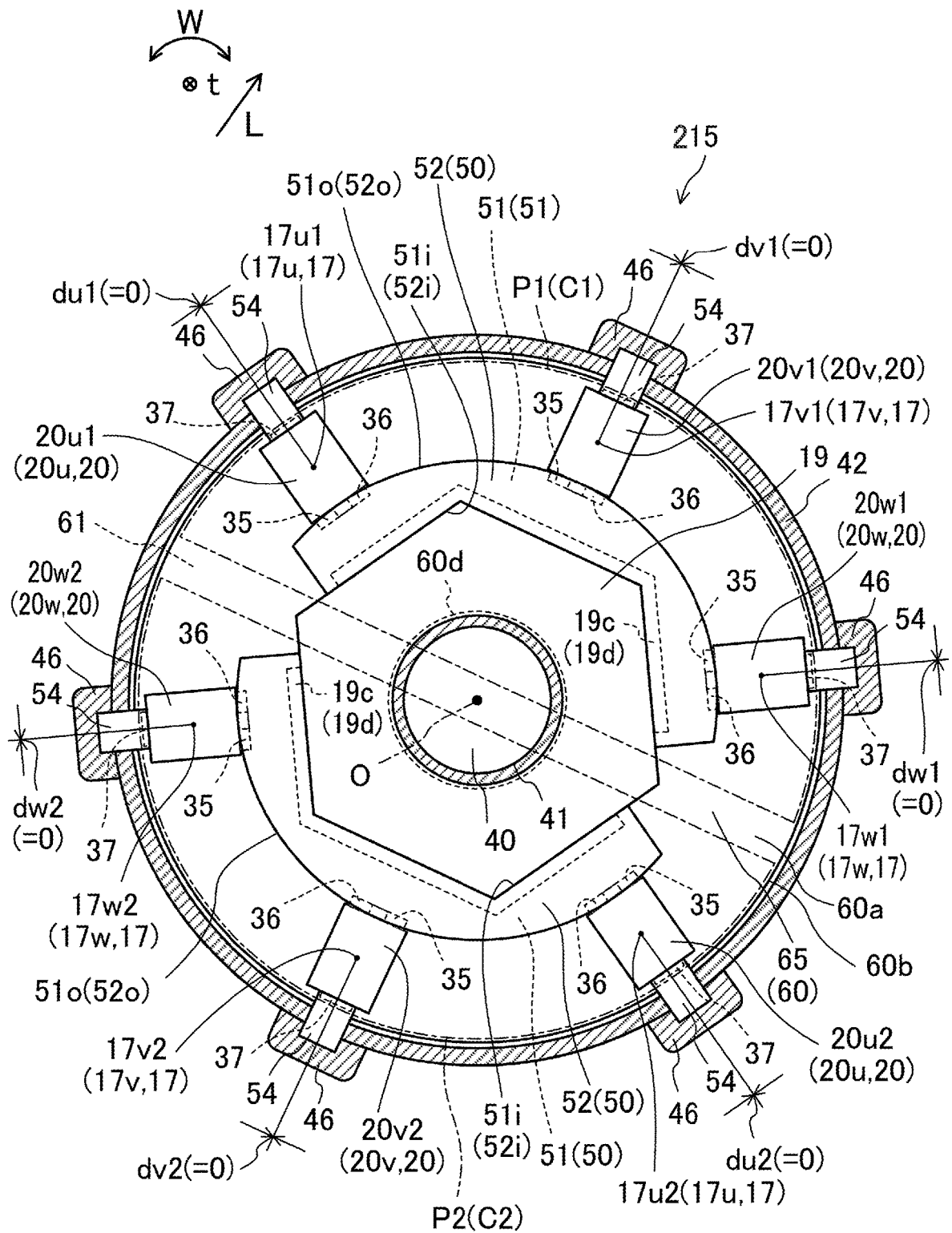
FIG. 14 is a view, corresponding to FIG. 7, of a second embodiment, and is a cross sectional view of an inverter when seen from a side opposite to a motor.
Figure 15:
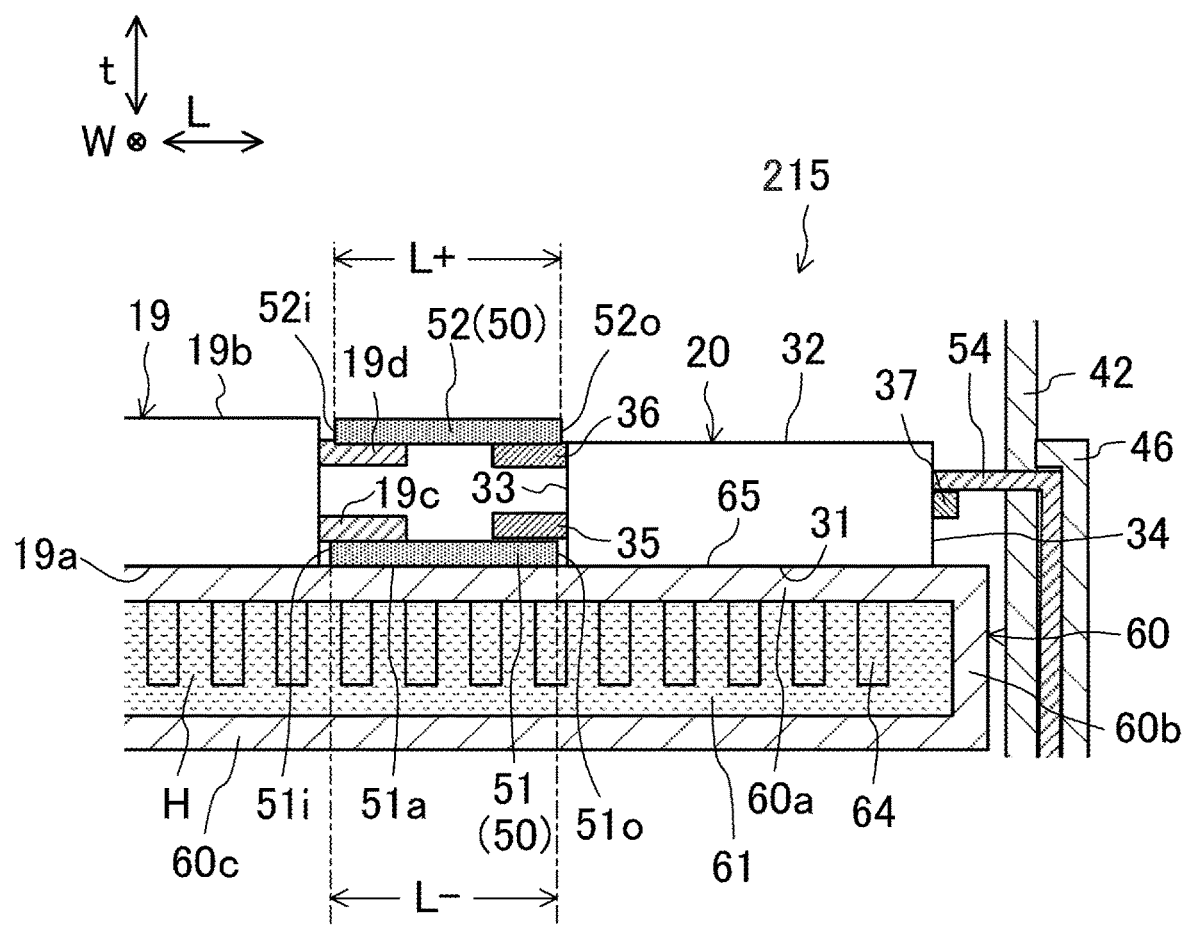
FIG. 15 is a view, corresponding to FIG. 8, of the second embodiment, and is a vertical sectional view of the inverter.

FIG. 14 is a view, corresponding to FIG. 7, of a second embodiment, and is a cross sectional view of an inverter 215 when seen from a side opposite to the motor 3. FIG. 15 is a view, corresponding to FIG. 8, of the second embodiment, and is a vertical sectional view of the inverter 215. A detailed description of structures that are the same as those of the embodiment above may not be given.

In the present embodiment, each power module 20 is disposed on an outer peripheral side with respect to a smoothing capacitor 19. On the outer peripheral side with respect to the smoothing capacitor 19, the power modules 20 are disposed side by side in a peripheral direction of the motor 3.

The input terminals 35 and 36 (first end surface 33) and the output terminal 37 (second end surface 34) of each power module 20 face a radial direction of the motor 3 (the inverter 215). Specifically, the input terminals 35 and 36 (the first end surface 33) of each power module 20 face an inner peripheral side. The output terminal 37 (the second end surface 34) of each power module 20 faces the outer peripheral side. Each power module 20 is disposed radially from the center O, which is the origin, of the inverter 215 (the motor 3).

As shown in FIG. 14, the width of the negative-electrode-side busbar 51 and the width of the positive-electrode-side busbar 52 are the same. As shown in FIG. 15, the length L− of the negative-electrode-side busbar 51 and the length L+ of the positive-electrode-side busbar 52 are the same. Therefore, the inductance of the negative-electrode-side busbar 51 and the inductance of the positive-electrode-side busbar 52 are equal to each other.

The other structures are the same as those of the first embodiment.

Third Embodiment

Figure 16:
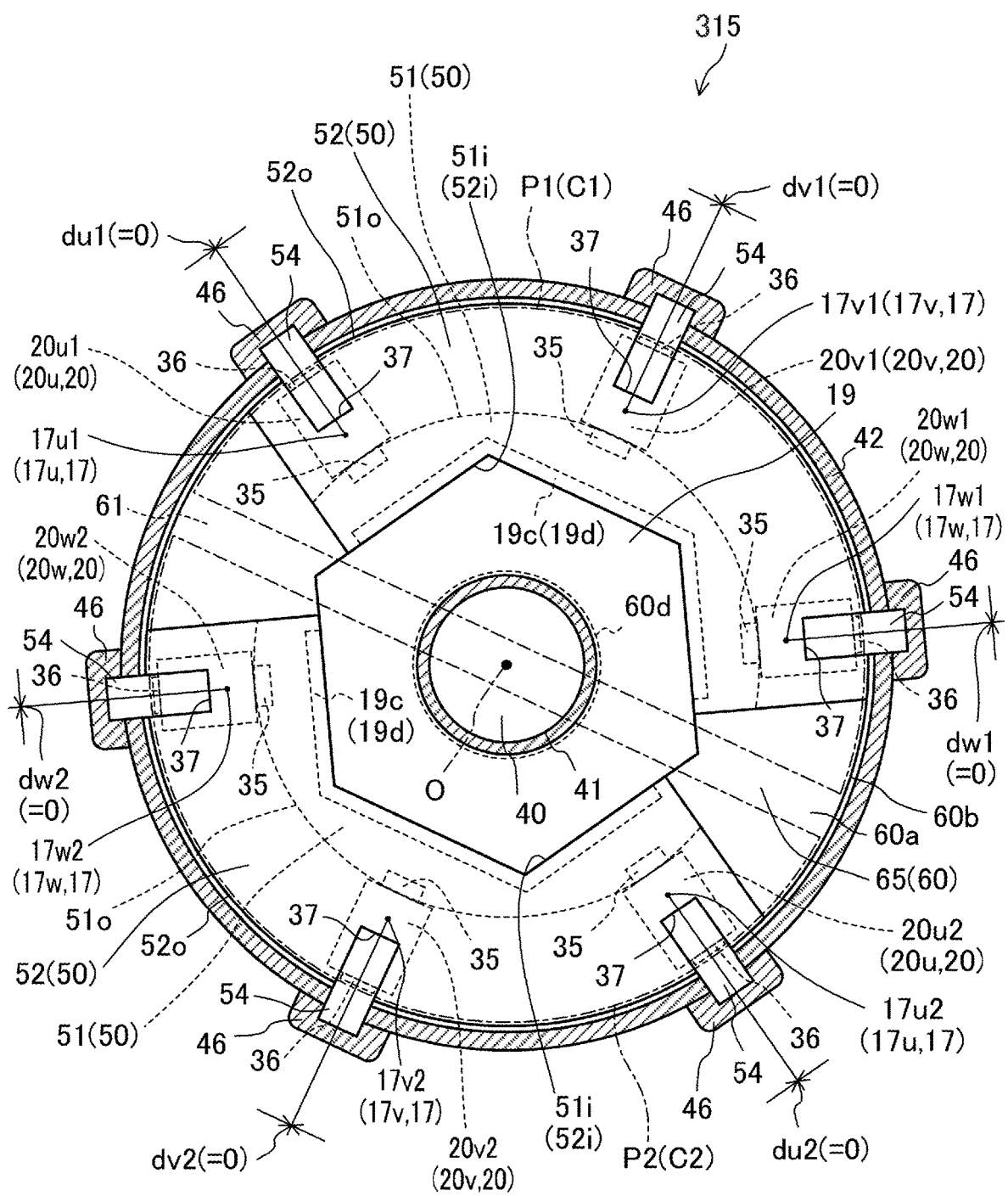
FIG. 16 is a view, corresponding to FIG. 7, of a third embodiment, and is a cross sectional view of an inverter when seen from a side opposite to a motor.
Figure 17:
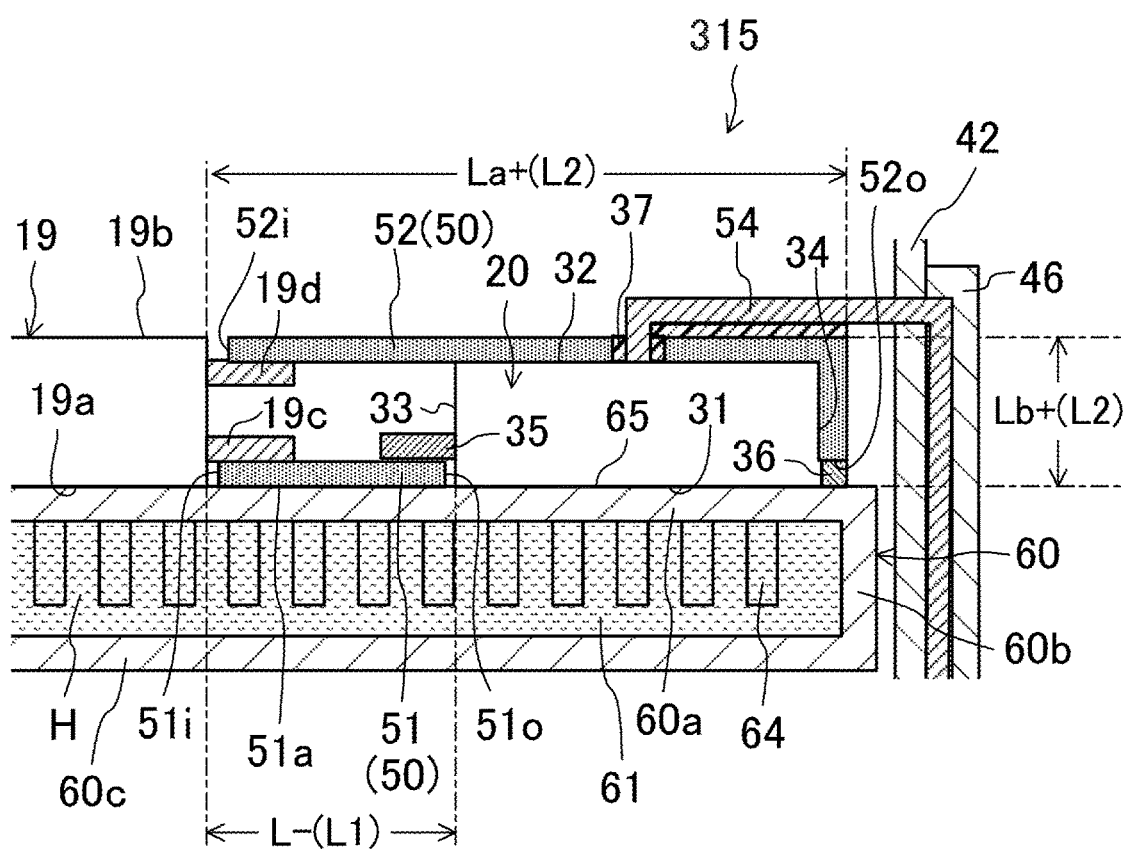
FIG. 17 is a view, corresponding to FIG. 8, of the third embodiment, and is a vertical sectional view of the inverter.

FIG. 16 is a view, corresponding to FIG. 7, of a third embodiment, and is a cross sectional view of an inverter 315 when seen from a side opposite to the motor 3. FIG. 17 is a view, corresponding to FIG. 8, of the third embodiment, and is a vertical sectional view of the inverter 315. A detailed description of structures that are the same as those of the embodiments above may not be given.

As shown in FIGS. 16 and 17, the negative-electrode-side input terminals 35 are each connected to a lower side of the first end surface 33 of a corresponding one of power modules 20. The positive-electrode-side input terminals 36 are each connected to a lower side of the second end surface 34 of the corresponding one of the power modules 20. The output terminals 37 are each connected to the center of the upper surface 32 of the corresponding one of the power modules 20.

The negative-electrode-side busbar 51 connects the negative-electrode terminal 19c of the smoothing capacitor 19 and the negative-electrode-side input terminal 35 of each power module to each other. The positive-electrode-side busbar 52 connects the positive-electrode terminal 19d of the smoothing capacitor 19 and the positive-electrode-side input terminal 36 of each power module 20 to each other.

The positive-electrode-side busbar 52 starts out from the positive-electrode terminal 19d of the smoothing capacitor 19 (one end portion 52i), and extends along the upper surface 32 to the second end surface 34 from the first end surface 33 of each power module 20. Then, the positive-electrode-side busbar 52 bends downward and extends along the second end surface 34 up to the positive-electrode-side input terminal 36 (other end portion 52o) on the lower side of each power module 20. In other words, the positive-electrode-side busbar 52 extends so as to be wound around each power module 20 from the upper surface 32. Each output busbar 54 starts out from the output terminal 37 at the upper surface 32 of each power module 20, and extends upward. The positive-electrode-side busbar 52 has three opening portions for passing three upwardly extending output busbars 54 therethrough.

As shown in FIG. 16, the width of the negative-electrode-side busbar 51 and the width of the positive-electrode-side busbar 52 are the same. As shown in FIG. 17, the length (L−) of the negative-electrode-side busbar 51 and the length (sum of La+ and Lb+) of the positive-electrode-side busbar 52 differ from each other. The length (L−) of the negative-electrode-side busbar 51 corresponds to the first length L1. The length (sum of La+ and Lb+) of the positive-electrode-side busbar 52 corresponds to the second length L2. The length (sum of La+ and Lb+, the second length L2) of the positive-electrode-side busbar 52 is larger than the length (L−, the first length L1) of the negative-electrode-side busbar 51. However, due to the existence of the minimum value M (see FIG. 10), the inductance of the negative-electrode-side busbar 51 and the inductance of the positive-electrode-side busbar 52 are equal to each other.

Note that the conditions (for example, materials) of the negative-electrode-side busbar 51 and the positive-electrode-side busbar 52 according to the present embodiment differ from those of the embodiments above. Therefore, the mode of the minimum value (M above) (see FIG. 10) also differs. Specifically, the difference between the first length L1 and the second length L2 is larger than that in the embodiments above.

The other structures are the same as those of the second embodiment.

Modification 1 of Third Embodiment

Figure 18:
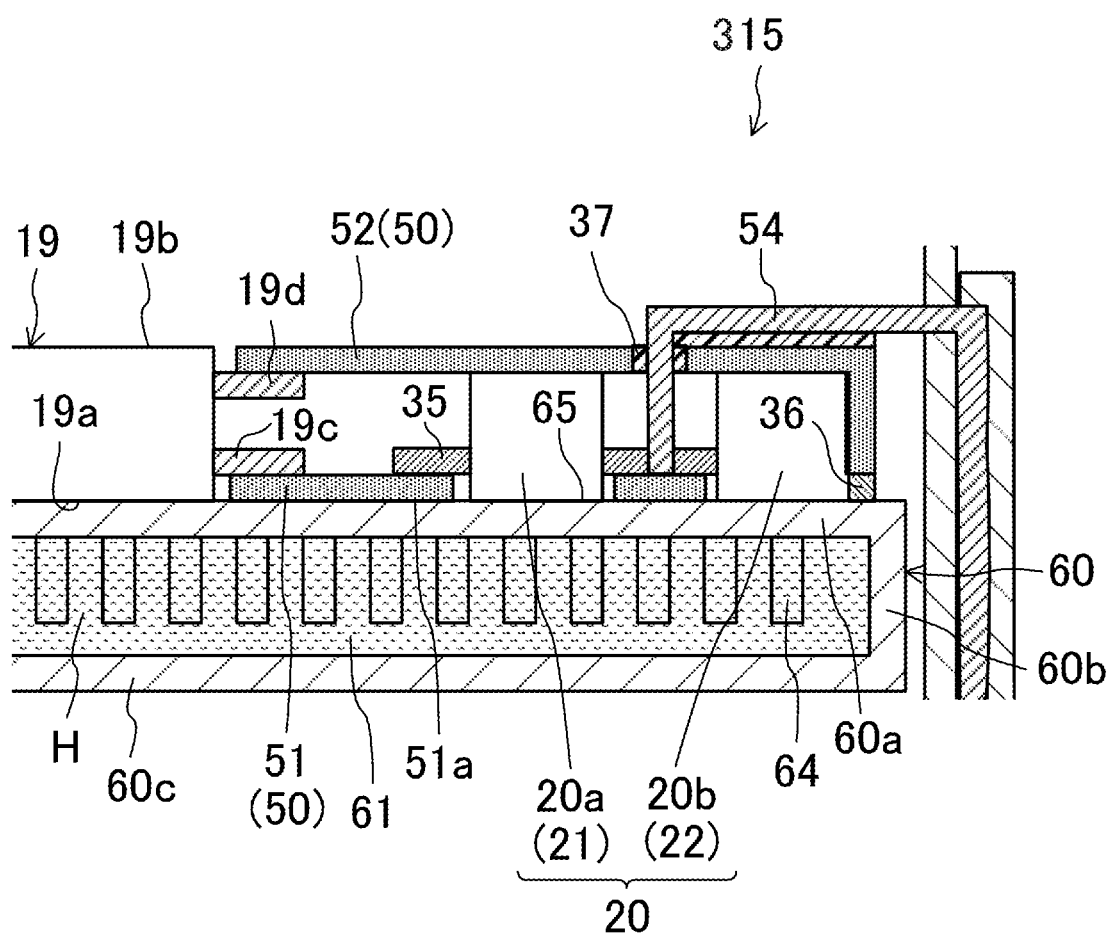
FIG. 18 is a view, corresponding to FIG. 8, of Modification 1 of the third embodiment, and is a vertical sectional view of an inverter.

FIG. 18 is a view, corresponding to FIG. 8, of Modification 1 of the third embodiment, and is a vertical sectional view of the inverter 315. Although in the embodiments above, each power module 20 accommodates both the lower arm element 21 and the upper arm element 22 in one package, the present modification differs. In the present modification, each power module 20 is separated into a first package 20a that accommodates the lower arm element 21 and a second package 20b that accommodates the upper arm element 22.

Modification 2 of Third Embodiment

Figure 19:
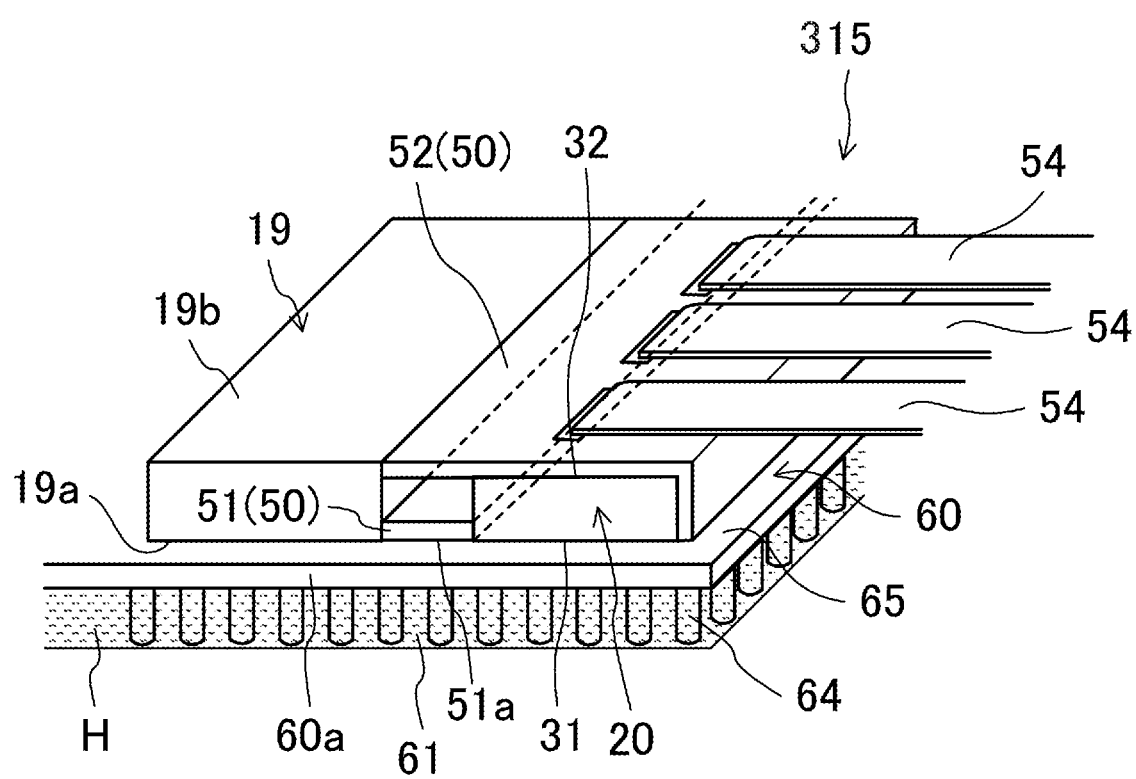
FIG. 19 is a perspective view of power modules and busbars according to Modification 2 of the third embodiment.

FIG. 19 is a perspective view of power modules 20 and busbars 50 according to Modification 2 of the third embodiment. In the present modification, each power module 20 is linearly disposed side by side. The width direction of each of the busbars 51 and 52 is a linear direction (direction in which each power module 20 is disposed side by side). Even in this case, in at least the first power module group P1 and the first coil group C1, when seen in the axial direction of the motor 3, the distances du1, dv1, and dw1 between the corresponding one of the phase power modules $20u1$, $20v1$, and $20w1$ and the corresponding one of the phase coils $17u1$, $17v1$, and $17w1$ are to be equal to each other between the U phase, the V phase, and the W phase.

OTHER EMBODIMENTS

Although the present disclosure has been described by way of preferred embodiments above, such descriptions are not limiting matters, and, naturally, various modifications are possible.

The present disclosure is applicable to a vehicle drive unit, and thus is very effective and has high industrial applicability.

What is claimed is:

1. A vehicle drive unit including a motor and an inverter disposed adjacent to each other in an axial direction of the motor, the inverter having a plurality of power modules,
wherein each power module is placed on a placement surface orthogonal to the axial direction,
wherein in the motor, at least a first coil group and a second coil group are provided, each including one U-phase coil, one V-phase coil, and one W-phase coil,
wherein the plurality of power modules constitute at least a first power module group and a second power module group that are connected in parallel,
wherein the first power module group and the second power module group each include one U-phase power module, one V-phase power module, and one W-phase power module corresponding to the U-phase coil, the V-phase coil, and the W-phase coil, respectively, of the first coil group or the second coil group,
wherein each power module of the first power module group is connected to a corresponding one of the coils of the first coil group,
wherein each power module of the second power module group is connected to a corresponding one of the coils of the second coil group, and
wherein when seen in the axial direction, a distance between the U-phase power module of the first power module group and the U-phase coil of the first coil group, a distance between the V-phase power module of the first power module group and the V-phase coil of the first coil group, and a distance between the W-phase power module of the first power module group and the W-phase coil of the first coil group are equal to each other.

2. The vehicle drive unit according to claim 1, wherein when seen in the axial direction, a distance between the U-phase power module of the second power module group and the U-phase coil of the second coil group, a distance between the V-phase power module of the second power module group and the V-phase coil of the second coil group, and a distance between the W-phase power module of the second power module group and the W-phase coil of the second coil group are equal to each other.

3. The vehicle drive unit according to claim 2, wherein when seen in the axial direction, the distance between the U-phase power module of the first power module group and the U-phase coil of the first coil group and the distance between the U-phase power module of the second power module group and the U-phase coil of the second coil group are equal to each other,
wherein when seen in the axial direction, the distance between the V-phase power module of the first power module group and the V-phase coil of the first coil group and the distance between the V-phase power module of the second power module group and the V-phase coil of the second coil group are equal to each other, and
wherein when seen in the axial direction, the distance between the W-phase power module of the first power module group and the W-phase coil of the first coil group and the distance between the W-phase power module of the second power module group and the W-phase coil of the second coil group are equal to each other.

4. The vehicle drive unit according to claim 3, wherein in the motor, the U-phase coils, the V-phase coils, and the W-phase coils of each of the first and second coil groups are each wound in a concentrated manner,
wherein when seen in the axial direction, the U-phase power module of the first power module group is disposed at a position overlapping the U-phase coils of the first coil group,
wherein when seen in the axial direction, the V-phase power module of the first power module group is disposed at a position overlapping the V-phase coils of the first coil group, and
wherein when seen in the axial direction, the W-phase power module of the first power module group is disposed at a position overlapping the W-phase coils of the first coil group.

5. The vehicle drive unit according to claim 4, wherein when seen in the axial direction, the U-phase power module of the second power module group is disposed at a position overlapping the U-phase coils of the second coil group,
wherein when seen in the axial direction, the V-phase power module of the second power module group is disposed at a position overlapping the V-phase coils of the second coil group, and
wherein when seen in the axial direction, the W-phase power module of the second power module group is disposed at a position overlapping the W-phase coils of the second coil group.

6. The vehicle drive unit according to claim 5, wherein each of the power modules of the first power module group is disposed on one side in a radial direction of the motor,
wherein each of the power modules of the second power module group is disposed on an opposite side in the radial direction,
wherein the U-phase power module of the first power module group and the U-phase power module of the second power module group oppose each other in the radial direction,
wherein the V-phase power module of the first power module group and the V-phase power module of the second power module group oppose each other in the radial direction, and wherein the W-phase power module of the first power module group and the W-phase power module of the second power module group oppose each other in the radial direction.

7. The vehicle drive unit according to claim 6, wherein at least an output busbar is interposed between each of the power modules and each of the coils, and
wherein the output busbar is formed with a width greater than a thickness thereof so as to extend widthwise along a peripheral direction of the motor.

8. The vehicle drive unit according to claim 7, wherein the inverter has a smoothing capacitor placed on the placement surface.

9. The vehicle drive unit according to claim 8, wherein the smoothing capacitor and each power module are connected to each other by a negative-electrode-side busbar and a positive-electrode-side busbar, serving as input busbars,
wherein one end portion of each input busbar is connected to the smoothing capacitor,
wherein the other end portion of each input busbar is connected to each power module,
wherein an inductance of each input busbar is a function of a length extending from the one end portion to the other end portion of each input busbar,
wherein the function has a minimum value so that the inductances become the same at a first length and a second length that differ from each other,
wherein the length of one of the negative-electrode-side busbar and the positive-electrode-side busbar is the first length, and
wherein the length of the other of the negative-electrode-side busbar and the positive-electrode-side busbar is the second length.

10. The vehicle drive unit according to claim 2, wherein, in the motor, the U-phase coils, the V-phase coils, and the W-phase coils of each of the first and second coil groups are each wound in a concentrated manner,
wherein when seen in the axial direction, the U-phase power module of the first power module group is disposed at a position overlapping the U-phase coils of the first coil group,
wherein when seen in the axial direction, the V-phase power module of the first power module group is disposed at a position overlapping the V-phase coils of the first coil group, and
wherein when seen in the axial direction, the W-phase power module of the first power module group is disposed at a position overlapping the W-phase coils of the first coil group.

11. The vehicle drive unit according to claim 2, wherein each of the power modules of the first power module group is disposed on one side in a radial direction of the motor,
wherein each of the power modules of the second power module group is disposed on an opposite side in the radial direction,
wherein the U-phase power module of the first power module group and the U-phase power module of the second power module group oppose each other in the radial direction,
wherein the V-phase power module of the first power module group and the V-phase power module of the second power module group oppose each other in the radial direction, and
wherein the W-phase power module of the first power module group and the W-phase power module of the second power module group oppose each other in the radial direction.

12. The vehicle drive unit according to claim 2, wherein at least an output busbar is interposed between each of the power modules and each of the coils, and
wherein the output busbar is formed with a width greater than a thickness thereof so as to extend widthwise along a peripheral direction of the motor.

13. The vehicle drive unit according to claim 1, wherein when seen in the axial direction, the distance between the U-phase power module of the first power module group and the U-phase coil of the first coil group and a distance between the U-phase power module of the second power module group and the U-phase coil of the second coil group are equal to each other,
wherein when seen in the axial direction, the distance between the V-phase power module of the first power module group and the V-phase coil of the first coil group and a distance between the V-phase power module of the second power module group and the V-phase coil of the second coil group are equal to each other, and
wherein when seen in the axial direction, the distance between the W-phase power module of the first power module group and the W-phase coil of the first coil group and a distance between the W-phase power module of the second power module group and the W-phase coil of the second coil group are equal to each other.

14. The vehicle drive unit according to claim 1, wherein in the motor, the U-phase coils, the V-phase coils, and the W-phase coils of each of the first and second coil groups are each wound in a concentrated manner,
wherein when seen in the axial direction, the U-phase power module of the first power module group is disposed at a position overlapping the U-phase coils of the first coil group,
wherein when seen in the axial direction, the V-phase power module of the first power module group is disposed at a position overlapping the V-phase coils of the first coil group, and
wherein when seen in the axial direction, the W-phase power module of the first power module group is disposed at a position overlapping the W-phase coils of the first coil group.

15. The vehicle drive unit according to claim 1, wherein each of the power modules of the first power module group is disposed on one side in a radial direction of the motor,
wherein each of the power modules of the second power module group is disposed on an opposite side in the radial direction,
wherein the U-phase power module of the first power module group and the U-phase power module of the second power module group oppose each other in the radial direction,
wherein the V-phase power module of the first power module group and the V-phase power module of the second power module group oppose each other in the radial direction, and
wherein the W-phase power module of the first power module group and the W-phase power module of the second power module group oppose each other in the radial direction.

16. The vehicle drive unit according to claim 1, wherein at least an output busbar is interposed between each of the power modules and each of the coils, and
wherein the output busbar is formed with a width greater than a thickness thereof so as to extend widthwise along a peripheral direction of the motor.

17. The vehicle drive unit according to claim 1, wherein the inverter has a smoothing capacitor placed on the placement surface.

18. The vehicle drive unit according to claim 17, wherein the smoothing capacitor and each power module are connected to each other by a negative-electrode-side busbar and a positive-electrode-side busbar, serving as input busbars,
wherein one end portion of each input busbar is connected to the smoothing capacitor,
wherein the other end portion of each input busbar is connected to each power module,
wherein an inductance of each input busbar is a function of a length extending from the one end portion to the other end portion of each input busbar,
wherein the function has a minimum value so that the inductances become the same at a first length and a second length that differ from each other,
wherein the length of one of the negative-electrode-side busbar and the positive-electrode-side busbar is the first length, and
wherein the length of the other of the negative-electrode-side busbar and the positive-electrode-side busbar is the second length.

19. A vehicle drive unit including a motor and an inverter disposed adjacent to each other in an axial direction of the motor, the inverter having a plurality of power modules,
wherein each power module is placed on a placement surface orthogonal to the axial direction,
wherein, in the motor, at least a first coil group and a second coil group are provided, each including one U-phase coil, one V-phase coil, and one W-phase coil,
wherein the plurality of power modules constitute at least a first power module group and a second power module group that are connected in parallel,
wherein the first power module group and the second power module group each include one U-phase power module, one V-phase power module, and one W-phase power module corresponding to the U-phase coil, the V-phase coil, and the W-phase coil, respectively, of the first coil group or the second coil group,
wherein each power module of the first power module group is connected to a corresponding one of the coils of the first coil group,
wherein each power module of the second power module group is connected to a corresponding one of the coils of the second coil group,
wherein when seen in the axial direction, the U-phase power module of the first power module group is disposed at a position overlapping the U-phase coil of the first coil group,
wherein when seen in the axial direction, the V-phase power module of the first power module group is disposed at a position overlapping the V-phase coil of the first coil group, and
wherein when seen in the axial direction, the W-phase power module of the first power module group is disposed at a position overlapping the W-phase coil of the first coil group.

20. The vehicle drive unit according to claim 19, wherein when seen in the axial direction, the U-phase power module of the second power module group is disposed at a position overlapping the U-phase coil of the second coil group,
wherein when seen in the axial direction, the V-phase power module of the second power module group is disposed at a position overlapping the V-phase coil of the second coil group, and
wherein when seen in the axial direction, the W-phase power module of the second power module group is disposed at a position overlapping the W-phase coil of the second coil group.

\* \* \* \* \*